(12) United States Patent
Kim et al.

(10) Patent No.: US 11,709,316 B2
(45) Date of Patent: Jul. 25, 2023

(54) WAVEGUIDES HAVING HIGHLY SUPPRESSED CROSSTALK

(71) Applicant: Texas Tech University System, Lubbock, TX (US)

(72) Inventors: Sangsik Kim, Daejeon (KR); Md Borhan Mia, San Jose, CA (US)

(73) Assignee: Texas Tech University System, Lubbock, TX (US)

( * ) Notice: Subject to any disclaimer, the term of this patent is extended or adjusted under 35 U.S.C. 154(b) by 0 days.

(21) Appl. No.: 17/798,167

(22) PCT Filed: Feb. 23, 2021

(86) PCT No.: PCT/US2021/019257
§ 371 (c)(1),
(2) Date: Aug. 8, 2022

(87) PCT Pub. No.: WO2021/168465
PCT Pub. Date: Aug. 26, 2021

(65) Prior Publication Data
US 2023/0119155 A1  Apr. 20, 2023

Related U.S. Application Data

(60) Provisional application No. 62/980,412, filed on Feb. 23, 2020.

(51) Int. Cl.
*G02B 6/12* (2006.01)
(52) U.S. Cl.
CPC .... *G02B 6/12002* (2013.01); *G02B 2006/121* (2013.01); *G02B 2006/12097* (2013.01); *G02B 2006/12107* (2013.01)

(58) Field of Classification Search
CPC .......................................... G02B 2006/12107
See application file for complete search history.

(56) References Cited

U.S. PATENT DOCUMENTS

| 2011/0158596 A1 | 6/2011 | Terada et al. |
| 2012/0314990 A1 | 12/2012 | Pitwon |
| 2013/0170803 A1 | 7/2013 | Mori et al. |

FOREIGN PATENT DOCUMENTS

| CN | 209086461 U | * | 7/2019 |
| KR | 10-2007-0075169 A | | 7/2007 |
| KR | 10-2012-0026367 A | | 3/2012 |

OTHER PUBLICATIONS

CN 209086461 U English translation (Year: 2019).*
(Continued)

*Primary Examiner* — Charlie Y Peng
(74) *Attorney, Agent, or Firm* — Daniel J. Chalker; Edwin S. Flores; Chalker Flores, LLP

(57) ABSTRACT

An optical waveguide includes a first waveguide core, a second waveguide core, a first subwavelength multilayer cladding, a second subwavelength multilayer cladding and a third subwavelength multilayer cladding. The first waveguide core and the second waveguide core have a width (w) and a height (h). The first waveguide core is disposed between the first subwavelength multilayer cladding and the second subwavelength multilayer cladding. The second waveguide core is disposed between the second subwavelength multilayer cladding and the third subwavelength multilayer cladding. Each subwavelength multilayer cladding has a number (TV) of alternating subwavelength ridges having a periodicy ($\Lambda$) and a filling fraction (p). A total coupling coefficient (l/cl) of the first waveguide core and the second waveguide core is from 10 to 0.

26 Claims, 18 Drawing Sheets

(56) References Cited

OTHER PUBLICATIONS

Kim et al, "Extreme Suppression of Waveguide Crosstalk with All-Dielectric Metamaterials", 2020 Conference on Lasers and Electro-Optics (CLEO) (Year: 2020).*
Mateus et al., "Ultrabroadband Mirror Using Low-Index Cladded Subwavelength Grating", IEEE Photonics Technology Letters, vol. 16, No. 2 (Year: 2004).*
International Search Report & Written Opinion, PCT/US2021/019257 [ISA/KR] dated Jun. 11, 2021.

* cited by examiner

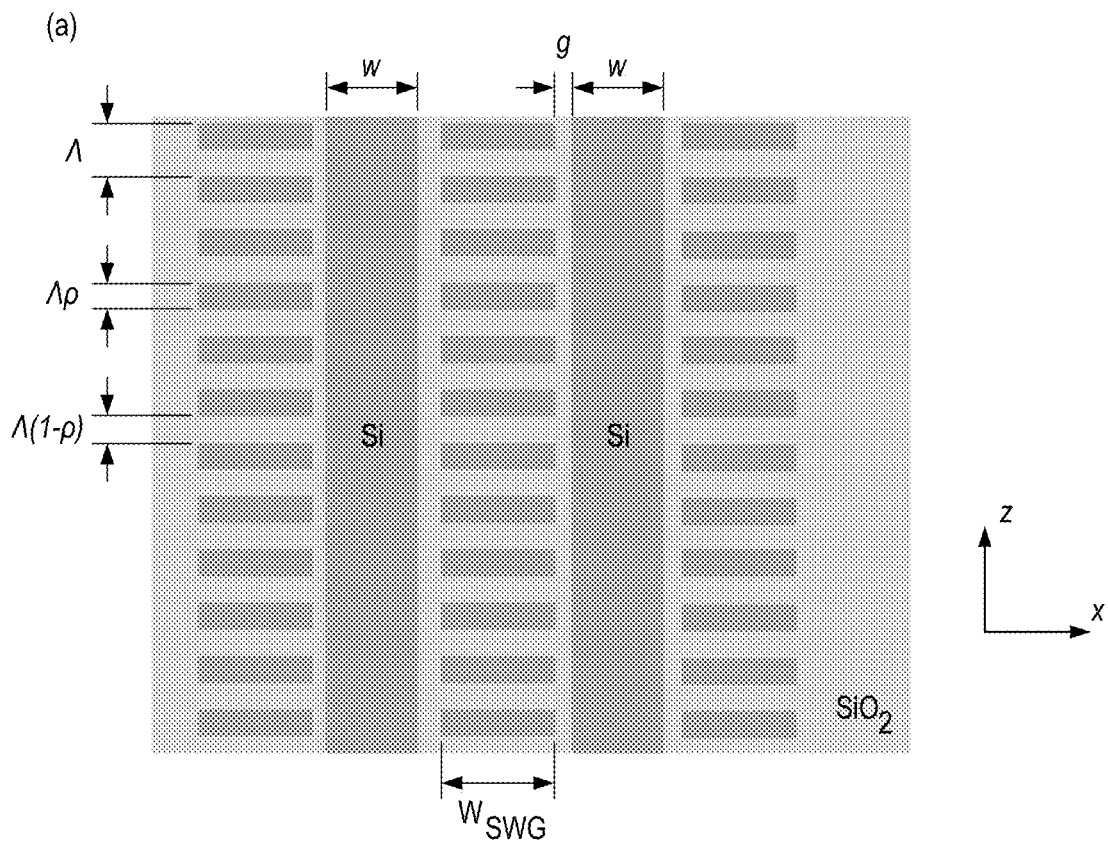
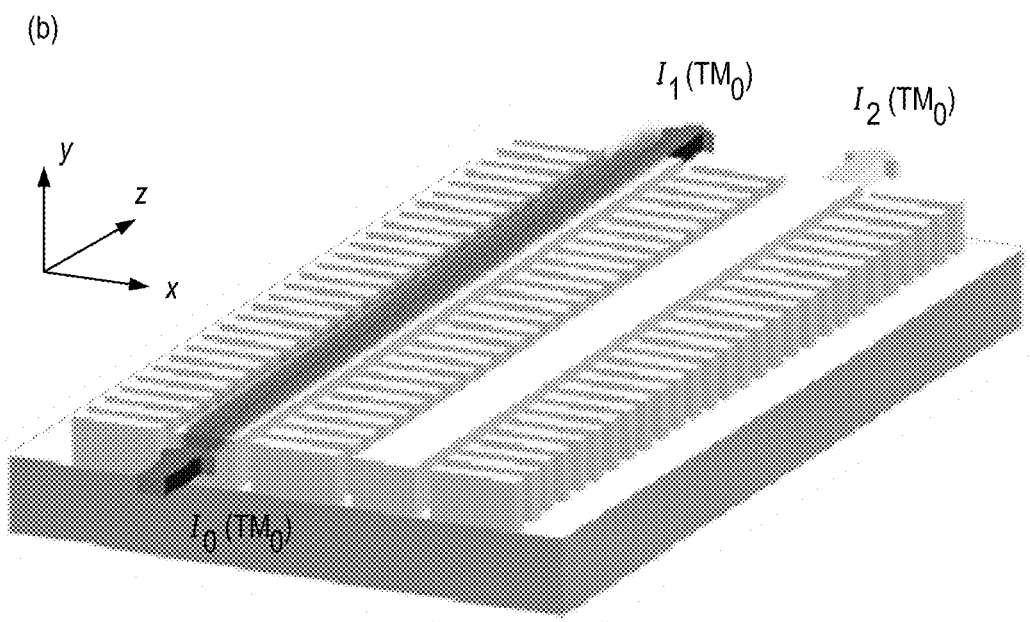
FIG. 12(a)-12(e)

(a)
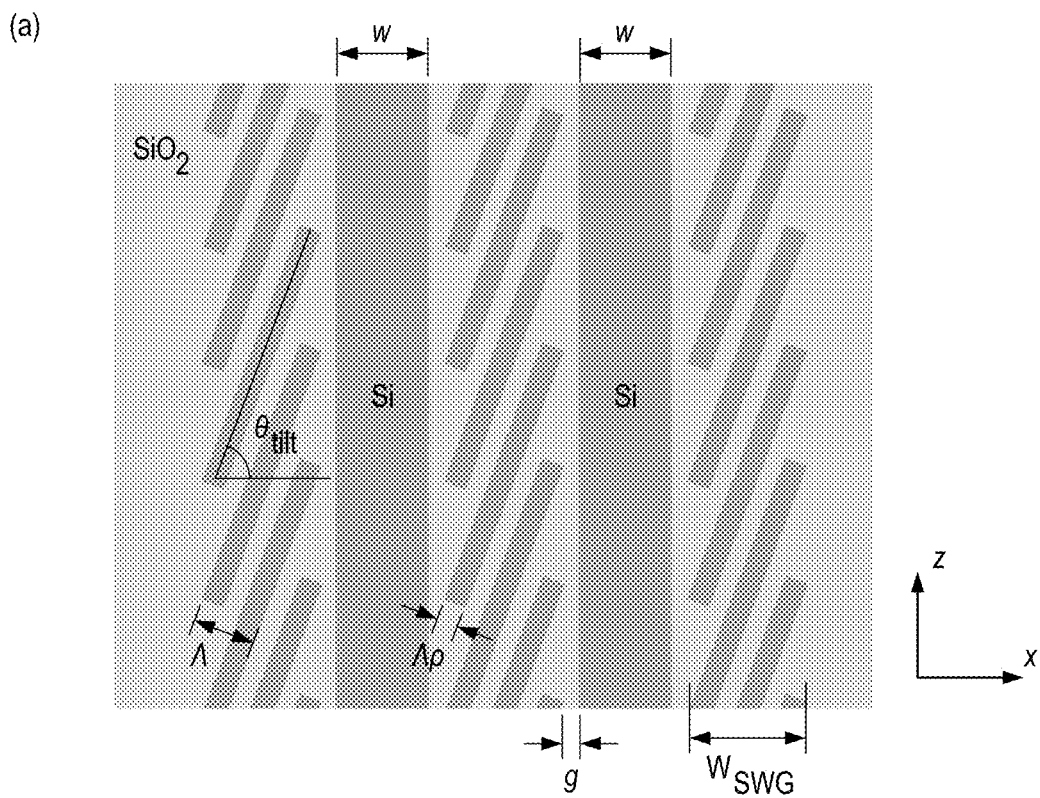
(b)
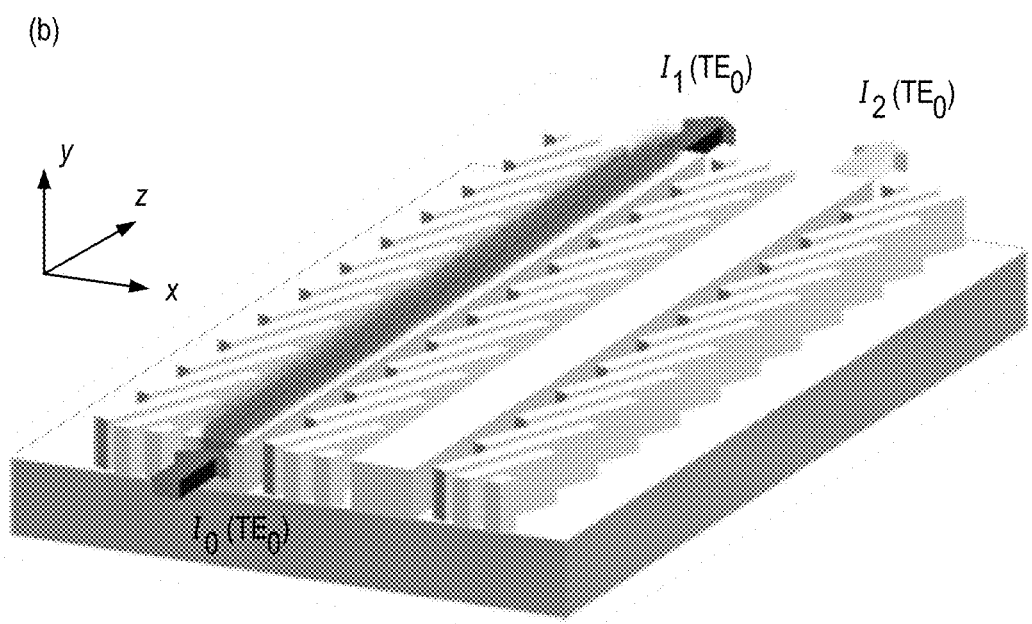
FIG. 13(a)-13(e)

WAVEGUIDES HAVING HIGHLY SUPPRESSED CROSSTALK

CROSS-REFERENCE TO RELATED APPLICATIONS

This patent application claims priority to and is the National Stage of International Application No. PCT/US2021/019257, filed on Feb. 23, 2021, which claims priority to U.S. provisional patent application Ser. No. 62/980,412 filed on Feb. 23, 2020, the entire contents of the foregoing applications are incorporated herein by reference.

STATEMENT OF FEDERALLY FUNDED RESEARCH

This invention was made with government support under ECCS-1930784 awarded by the National Science Foundation. The government has certain rights in the invention.

TECHNICAL FIELD OF THE INVENTION

The present invention relates in general to the field of waveguides. In particular, the present invention relates to devices and methods for exceptional coupling in extreme skin-depth waveguides for extremely low waveguide crosstalk.

BACKGROUND OF THE INVENTION

Without limiting the scope of the invention, its background is described in connection with extreme skin-depth waveguides.

Photonic chips can miniaturize a bulk optical system into a single tiny chip, confining light down to hundreds of nanometer-scale waveguide cross-sections. A compact, chip-scale device size allows the use of photonic systems outside of the laboratory and the integration of photonic chips with electronic circuitry leads to a broad range of applications in high-speed optical communication [1-6], chemical- and bio-sensing [7-11], high-precision spectroscopy [12, 13], and light detection and ranging (LIDAR) [14-17]. The large index-contrast between silicon (Si) and silicon dioxide ($SiO_2$) allows the integration of highly complicated photonic integrated circuits (PICs) on a silicon-on-insulator (SOI) wafer, and its compatibility with a complementary metal-oxide-semiconductor (CMOS) manufacturing process offers an opportunity for low-cost solutions for large-scale device fabrication. Furthermore, recent advances with high-Q microresonators significantly enhance the light-matter interaction and have revolutionized fundamental research in nonlinear and quantum photonics [18-20], atomic physics [21-24], and time/frequency metrology [25-28]. In many applications, realizing a high-density photonic chip integration is highly desired, as more building blocks provide more functionalities on a single chip [5, 6]. It also could reduce the unit cost of mass production and lower the power consumption within the chip. However, further miniaturization of photonic chips is hampered by the wave nature of light, i.e., the evanescent wave in the cladding causes the waveguide crosstalk.

The waveguide crosstalk is the power transfer of a light signal between the adjacent waveguides due to the evanescent waves. In a typical photonic chip, to avoid the crosstalk, waveguides need to be separated large enough (e.g., a gap larger than 10 μm or more) and this limits the integration density of photonic chips. To overcome this limit, there have been many research efforts directed toward reducing the device sizes and waveguide crosstalk [29-41]. Plasmonic nanostructures have been highlighted with their ability to confine light down to the subwavelength scale [29-35]; however, there exist unavoidable metallic losses to consider. Approaches that use a waveguide super-lattice [36, 37], inverse design [38, 39], or transformations optics [40] have been proposed, yet these approaches add more complexity or phase variations in the design, and often lead to higher scattering losses. Recently, several on chip photonic metamaterials have been explored [41-47]; among them, an extreme skin-depth (e-skid) waveguide that utilizes all-dielectric metamaterial claddings has been proposed to reduce the crosstalk [41]. The subwavelength-scale multi-layers effectively work as a highly anisotropic metamaterial and suppress the evanescent waves in the cladding. This reduces the crosstalk compared to a typical strip waveguide and an approximately 30 times longer coupling length has been demonstrated on an SOI platform. However, even with the reduced skin-depth, there still is some degree of crosstalk, and the further question remains as to if it is possible to suppress the crosstalk completely.

Accordingly, there is a need for devices and methods for improved coupling and low waveguide crosstalk.

SUMMARY OF THE INVENTION

Various embodiments of the present invention demonstrate that waveguide crosstalk can be suppressed completely with the exceptional coupling in extreme skin-depth (eskid) waveguides. The anisotropic dielectric perturbations in the coupled eskid waveguides cause such an exceptional coupling, resulting in infinitely long coupling length. The exceptional coupling can be engineered with the anisotropic properties of the metamaterial claddings and the modal overlap between the two coupled modes. These phenomena are shown on a silicon-on-insulator (SOI) platform, which is compatible with a complementary metal-oxide-semiconductor (CMOS) process. Exceptional coupling in eskid waveguides can be applied to many other photonic devices as well, reducing entire chip footprints.

In one embodiment, an optical waveguide includes: a first waveguide core having a width (w) and a height (h), wherein the first waveguide core is disposed between a first subwavelength multilayer cladding and a second subwavelength multilayer cladding; a second waveguide core having the width (w) and the height (h), wherein the second waveguide core is disposed between the second subwavelength multilayer cladding and a third subwavelength multilayer cladding; each subwavelength multilayer cladding comprising a number (N) of alternating subwavelength ridges having a periodicy (Λ) and a filling fraction (ρ); and wherein a total coupling coefficient (|κ|) of the first waveguide core and the second waveguide core is from 10 to 0.

In one aspect, the total coupling coefficient (|κ|) is about zero. In another aspect, an effective refractive index of a coupled symmetric mode ($n_s$) between the first waveguide core and the second waveguide core is approximately equal to an effective refractive index of a coupled anti-symmetric mode ($n_a$) between the first waveguide core and the second waveguide core. In another aspect, a crosstalk of the first waveguide core and the second waveguide core is suppressed down about −50 dB to −60 dB. In another aspect, the width (w) is from 350 nm to 500 nm; the number (N) of alternating subwavelength ridges is from 3 to 5; the periodicy (Λ) is from 2 to 130 nm; and the filling fraction (ρ) is from 0.4 to 0.6. In another aspect, the width (w) is selected create the total coupling coefficient (|κ|) when the width (w), the height (h), the number (N) of alternating subwavelength ridges, the periodicy (Λ) and the filling fraction (ρ) are specified. In another aspect, the first waveguide core and second waveguide core comprise silica or silicon. In another aspect, the first waveguide core and second waveguide core comprise a cross-sectional shape that is circular, square, rectangular, a slab, a slot, a strip, or a rib. In another aspect, the subwavelength multilayer cladding comprises an anisotropic metamaterial. In another aspect, the alternating subwavelength ridges are substantially parallel to the first and second waveguide cores. In another aspect, the alternating subwavelength ridges are substantially perpendicular to the first and second waveguide cores. In another aspect, the alternating subwavelength ridges are tilted with respect to the first and second waveguide cores by a tilted angle. In another aspect, the tilted angle is approximately 73 degrees.

In another embodiment, a method of fabricating a waveguide includes: providing a substrate; creating a first waveguide core and a second waveguide core on the substrate, wherein the first waveguide core and the second waveguide core each have a width (w) and a height (h); creating a first subwavelength multilayer cladding, a second subwavelength multilayer cladding and a third subwavelength multilayer cladding on the substrate, wherein the first waveguide core is disposed between the first subwavelength multilayer cladding and the second subwavelength multilayer cladding, the second waveguide is disposed between the second subwavelength multilayer cladding and the third subwavelength multilayer cladding, and each subwavelength multilayer cladding comprises a number (N) of alternating subwavelength ridges having a periodicy (Λ) and a filling fraction (ρ); and wherein a total coupling coefficient (|κ|) of the first waveguide core and the second waveguide core is from 10 to 0.

In one aspect, the total coupling coefficient (|κ|) is about zero. In another aspect, an effective refractive index of a coupled symmetric mode ($n_s$) between the first waveguide core and the second waveguide core is approximately equal to an effective refractive index of a coupled anti-symmetric mode ($n_a$) between the first waveguide core and the second waveguide core. In another aspect, a crosstalk of the first waveguide core and the second waveguide core is suppressed down about −50 dB to −60 dB. In another aspect, the width (w) is from 350 nm to 500 nm; the number (N) of alternating subwavelength ridges is from 3 to 5; the periodicy (Λ) is from 2 to 130 nm; and the filling fraction (ρ) is from 0.4 to 0.6. In another aspect, the method further includes selecting the width (w) to create the total coupling coefficient (|κ|) when the width (w), the height (h), the number (N) of alternating subwavelength ridges, the periodicy (Λ) and the filling fraction (ρ) are specified. In another aspect, the first waveguide core and second waveguide core comprise silica or silicon. In another aspect, the first waveguide core and second waveguide core comprise a cross-sectional shape that is circular, square, rectangular, a slab, a slot, a strip, or a rib. In another aspect, the subwavelength multilayer cladding comprises an anisotropic metamaterial. In another aspect, the alternating subwavelength ridges are substantially parallel to the first and second waveguide cores. In another aspect, the alternating subwavelength ridges are substantially perpendicular to the first and second waveguide cores. In another aspect, the alternating subwavelength ridges are tilted with respect to the first and second waveguide cores by a tilted angle. In another aspect, the tilted angle is approximately 73 degrees.

The foregoing is a summary and thus contains, by necessity, simplifications, generalizations, and omissions of detail. Consequently, those skilled in the art will appreciate that this summary is illustrative only and is not intended to be in any way limiting. There aspects, features, and advantages of the devices, processes, and other subject matter described herein will be become apparent in the teachings set forth herein.

BRIEF DESCRIPTION OF THE DRAWINGS

For a more complete understanding of the features and advantages of the present invention, reference is now made to the detailed description of the invention along with the accompanying figures, in which.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The coupled modes of eskid waveguides are explored herein to examine the limit of the waveguide crosstalk and show that there exists an exceptional coupling point where the crosstalk can be suppressed completely. The coupled mode analysis described below reveals that the anisotropic dielectric perturbation of eskid waveguides causes a nontrivial coupled regime, where the modal index of the anti-symmetric mode is higher than that of the symmetric mode, and an exceptional coupling at the transition to the non-trivial coupling regime. Experiments demonstrate such exceptional couplings on an SOI wafer, which achieve extremely long coupling lengths. The exceptional coupling point can be engineered using the modal overlaps with waveguide geometries and the anisotropic properties of metamaterial claddings.

Figures 1A, 1B, 1C, 1D, 1E, 1F, 1G, 1H, 1I:
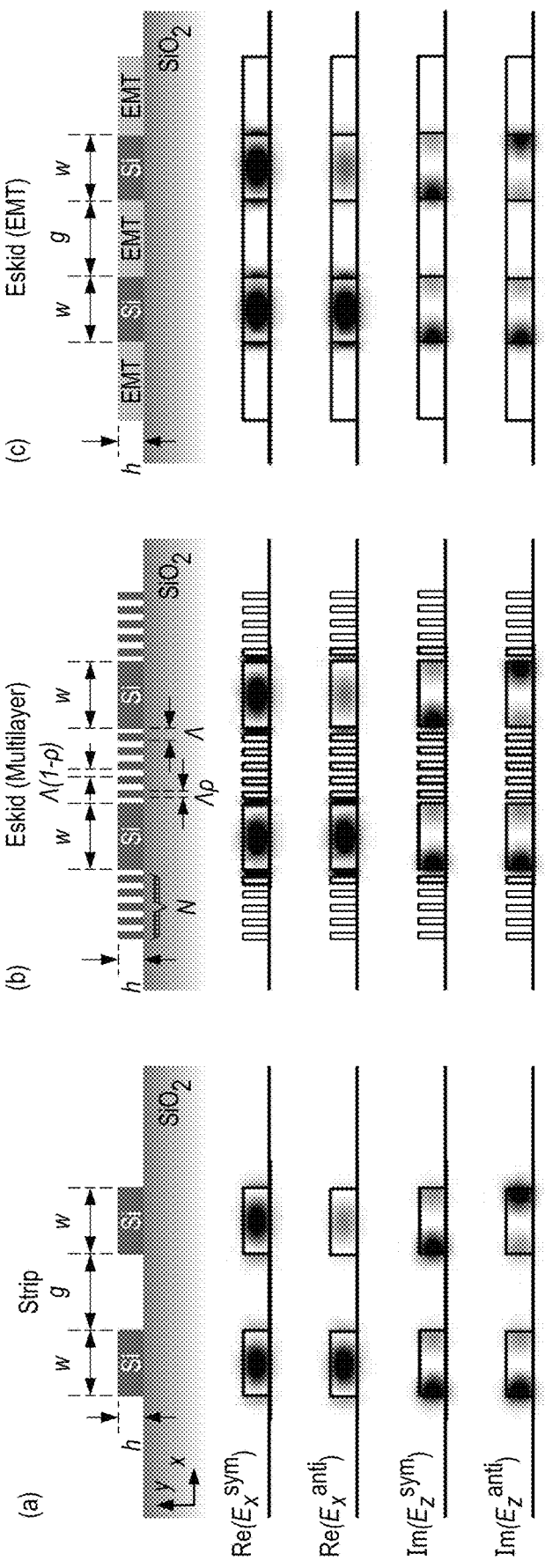
FIGS. 1(a)-1(c) depict schematic cross-sections, geometric parameters, and mode profiles of the coupled silicon waveguides: (a) strip, (b) practical eskid with subwavelength multilayers, and (c) ideal eskid with effective medium theory (EMT)
FIGS. 1(d)-1(f) depict numerically simulated effective indices of the symmetric $n_s$ (yellow solid) and anti-symmetric $n_a$ (blue dashed) modes for the coupled silicon waveguides: (d) strip, (e) practical eskid with subwavelength multilayers, and (f) ideal eskid with effective medium theory (EMT)
FIGS. 1(g)-1(i) depict the corresponding normalized coupling lengths $L_c/\lambda_0=1/(2|n_s-n_a|)$ (blue dots) for the coupled silicon waveguides: (g) strip, (h) practical eskid with subwavelength multilayers, and (i) ideal eskid with effective medium theory (EMT)
Figures 1A, 1B, 1C, 1D, 1E, 1F, 1G, 1H, 1I:
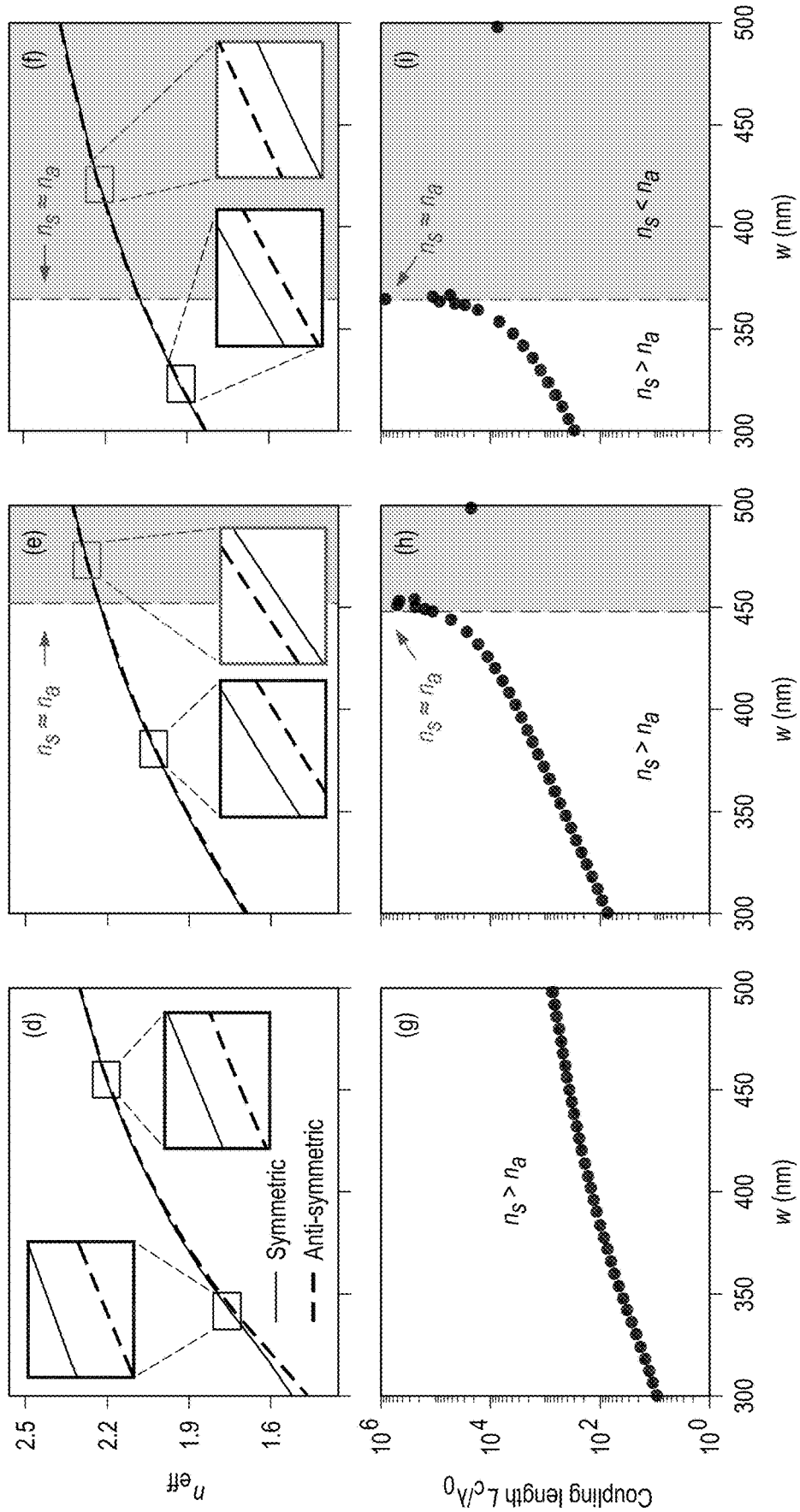

The primary bottleneck that prevents a high-density photonic chip integration is the waveguide crosstalk. To push the limit of chip integration density, the exceptional coupling phenomena in the eskid waveguides is explored by evaluating coupling lengths of the three different coupled waveguide schemes. FIGS. 1(a)-(c) show the schematic cross-sections and geometric parameters of the three coupled waveguide configurations: (a) typical strip waveguides, (b) practical eskid waveguides with subwavelength-scale multilayer claddings, and (c) ideal eskid waveguides with anisotropic metamaterial claddings using the effective medium theory (EMT). All configurations are implemented on an SOI platform, i.e., Si and Sift as a core and a substrate, respectively. The coupled modes between the two identical fundamental quasi-transverse-electric (quasi-TE$_0$) modes, and the electric field profiles Re(E$_x$) and Im(E$_z$) of the coupled symmetric (sym) and antisymmetric (anti) modes are plotted in FIGS. 1(a)-(c). The multilayer eskid in FIG. 1(b) is a practical structure that can be fabricated with the current electron-beam lithography [41] and CMOS technology [48, 49]. The EMT eskid in FIG. 1(c) is an equivalent model with an anisotropic metamaterial, and its permittivities ($\varepsilon_x = \varepsilon_\perp$ and $\varepsilon_y = \varepsilon_z = \varepsilon_k$) follow [41, 50, 51], $$\varepsilon_k = \rho \varepsilon_{Si} + (1-\rho)\varepsilon_{air} \tag{1a}$$

$$\frac{\varepsilon_{Si}\varepsilon_{air}\varepsilon_\perp =}{\rho\varepsilon_{air} + (1-\rho)\varepsilon_{Si}} \tag{1b}$$

where: $\varepsilon_{Si}$ and $\varepsilon_{air}$ are the permittivities of Si and air, respectively; and ρ is the filling fraction of Si.

Note that, due to the large index contrast between Si and air, a huge anisotropy can appear with the subwavelength-scale multilayers, and its anisotropy can be engineered by controlling the p. With the increased anisotropy, the skin-depth in the cladding can be reduced, lowering the waveguide crosstalk [41, 51]. The periodicity Λ and ρ of the multilayers are to be 100 nm and 0.5, respectively, considering the minimum feature size of 50 nm. Other parameters are set to be h=220 nm, g=550 nm, and N=5, unless otherwise specified.

FIGS. 1(a)-1(i) illustrate on-chip coupled waveguide configurations and exceptional coupling in coupled extreme skin-depth (eskid) waveguides. More specifically, FIGS. 1(a)-1(c) depict schematic cross-sections, geometric parameters, and mode profiles of the coupled silicon waveguides: (a) strip, (b) practical eskid with subwavelength multilayers, and (c) ideal eskid with effective medium theory (EMT). FIGS. 1(d)-1(f) depict numerically simulated effective indices of the symmetric n$_s$ (yellow solid) and anti-symmetric n$_a$ (blue dashed) modes for the coupled silicon waveguides: (d) strip, (e) practical eskid with subwavelength multilayers, and (f) ideal eskid with effective medium theory (EMT). FIGS. 1(g)-1(i) depict the corresponding normalized coupling lengths L$_c$/λ$_0$=1/(2|n$_s$−n$_a$|) (blue dots) for the coupled silicon waveguides: (g) strip, (h) practical eskid with subwavelength multilayers, and (i) ideal eskid with effective medium theory (EMT). All the simulations are performed as a function of the core width w, while fixing the other parameters as h=220 nm, Λ=100 nm, ρ=0.5, and N=5. The free space wavelength is λ$_0$=1550 nm. The inset boxes of (d-f) show the zoomed-in view of each mode, and the red-shaded areas in (e, h) and (f, i) show the non-trivial coupling regimes, where n$_s$<n$_a$, which cannot be observed in a typical strip coupling (d, g). The red vertically dashed lines in (e, h) and (f, i) indicate the exceptional coupling points, where n$_s$≈n$_a$, thus causing the L$_c$→∞ in ideal cases.

The crosstalk between the two adjacent waveguides is assessed by evaluating the coupling length L$_c$, which quantifies the length that transfers the optical power completely from one waveguide to the other waveguide [52]; i.e., the crosstalk is lower for a longer L$_c$, and it's the opposite for a shorter L$_c$. To compare the coupling lengths of each configuration, effective refractive indices of the coupled symmetric (n$_s$, yellow solid) and anti-symmetric (n$_a$, blue dashed) modes are simulated in FIGS. 1(d)-1(f), and their corresponding normalized coupling lengths (blue dots) are plotted in FIGS. 1(g)-1(i): (d, g) strip waveguides, (e, h) eskid with multilayer, and (f, i) eskid with EMT. Each coupling length is normalized by the free-space wavelength at λ$_0$=1550 nm and the L$_c$ of the two identical waveguides can be calculated by [52, 53]

$$\frac{L_c}{\lambda_0} = \frac{1}{2\Delta n} = \frac{1}{2|n_s - n_a|} \tag{2}$$

where: Δn=|n$_s$−n$_a$| is the magnitude of the index difference between n$_s$ and n$_a$.

The inset boxes in FIGS. 1(d)-1(f) show the zoomed-in view of n$_s$ and n$_a$ at different regimes. Notice that, in the coupled eskids of FIGS. 1(e)-1(f), there are non-trivial coupling regimes where n$_s$<n$_a$ (red-shaded region). This non-trivial coupling is not observable in typical strip waveguides (FIG. 1(d)), and, it is believed that this is not observable with other types of waveguides either. More importantly, at the transition point from a typical coupling regime (n$_s$>n$_a$) to the non-trivial coupling regime (n$_s$<n$_a$), there is an exceptional coupling where Δn approaches zero (i.e., n$_s$≈n$_a$). These exceptional coupling points are indicated with red vertical dashed lines. As shown in FIGS. 1(h) and 1(i), at these exceptional points, the coupling length approaches to infinity, i.e., the crosstalk is completely suppressed. For multilayer and EMT cases, the exceptional points appear at different w. This is due to the deviations of effective ε$_\perp$ and ε$_k$ of the multilayer compared to those of ideal EMT. As the Λ is reduced, the effective indices of the multilayer approach those of ideal EMT and the results in FIGS. 1(e) and 1(h) will approach those in FIGS. 1(f) and 1(i).

Figures 2A, 2B, 2C, 2D:
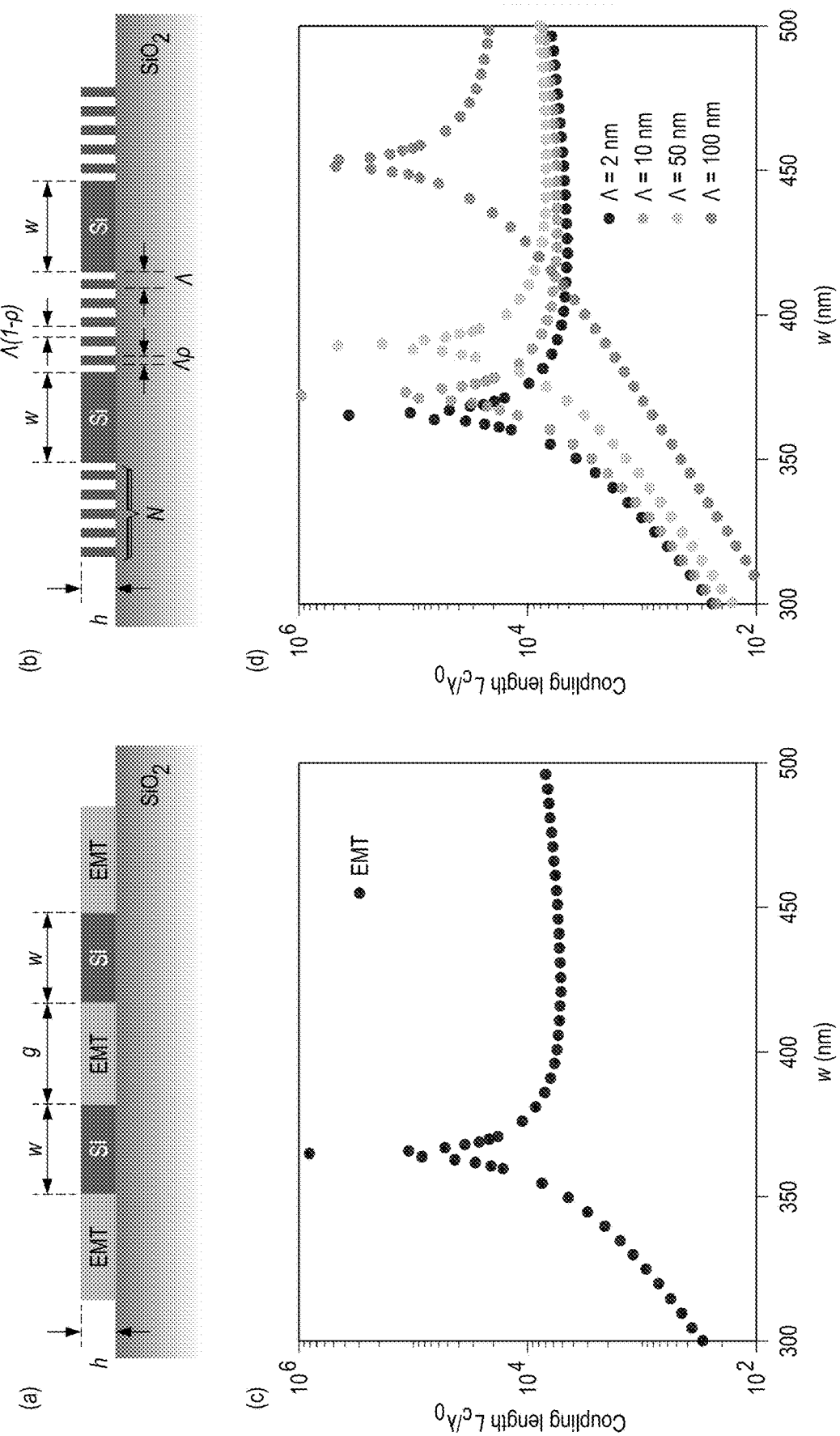
FIGS. 2(a)-2(b) depict schematics of the (a) ideal eskid with effective medium theory (EMT) and (b) practical eskid with multilayer claddings.
FIGS. 2(c)-2(d) depict normalized coupling lengths $L_c/\lambda_0$ for the coupled eskid waveguides with (c) EMT and (d) multilayers with different periodicity: Λ=2 nm (blue dots), 10 nm (orange dots), 50 nm (yellow dots), and 100 nm (purple dots)

FIGS. 2(a)-2(b) depict schematics of the (a) ideal eskid with effective medium theory (EMT) and (b) practical eskid with multilayer claddings. FIGS. 2(c)-2(d) depict normalized coupling lengths L$_c$/λ$_0$ for the coupled eskid waveguides with (c) EMT and (d) multilayers with different periodicity: Λ=2 nm (blue dots), 10 nm (orange dots), 50 nm (yellow dots), and 100 nm (purple dots). The filling fraction is set to ρ=0.5 and the other parameters are h=220 nm, g=550 nm, and λ$_0$=1550 nm. Note that, as the Λ reduces, the exceptional coupling point with multilayers in (d) approaches to that with EMT in (c). This is because the subwavelength-scale multilayer structure approaches an ideal EMT metamaterial as the Λ reduces (i.e, Λ<<λ) [50].

To understand the underlying mechanism of the exceptional coupling, each of the coupled waveguide configurations were analyzed using the anisotropic coupled mode analysis. In a quasi-TE$_0$ mode, an E$_x$ component is dominant but there is an E$_z$ component as well. Thus, to address the coupled modes correctly, the anisotropic coupling coefficients from all the field components (i.e., κ$_x$, κ$_y$, and κ$_z$) should be considered [52, 53]:

$$\kappa_i = \frac{\omega\varepsilon_0}{4}\int\int \Delta\varepsilon_i(x,y)E_{1i}(x,y)E^*_{2i}(x,y)dxdy \tag{3}$$

where: the subscript i=x, y, and z;

E$_{1i}$ and E$_{2i}$ are the normalized electric fields of isolated (without coupling) quasi-TE$_0$ modes at each side and Δ$_{\varepsilon i}$ is the dielectric perturbation between them.

Note that, for isotropic media, as in typical strip waveguides, all the dielectric perturbation components are the same (i.e., $\Delta\varepsilon_x=\Delta\varepsilon_y=\Delta\varepsilon_z$); however, for anisotropic cases, as in eskid waveguides, they are different (i.e., $\Delta\varepsilon_x\neq\Delta\varepsilon_y=\Delta\varepsilon_z$), causing the nontrivial coupling regime. The overall coupling coefficient $|\kappa|$ can be obtained by adding each component together, $$|\kappa|=|\kappa_x+\kappa_y+\kappa_z| \quad (4)$$

and the coupling length of the two same waveguides with $|\kappa|$ is the following [52, 53]:

$$L_c = \frac{\pi}{2|\kappa|} \quad (5)$$

Figures 3A, 3B, 3C, 3D, 3E, 3F, 3G, 3H, 3I:
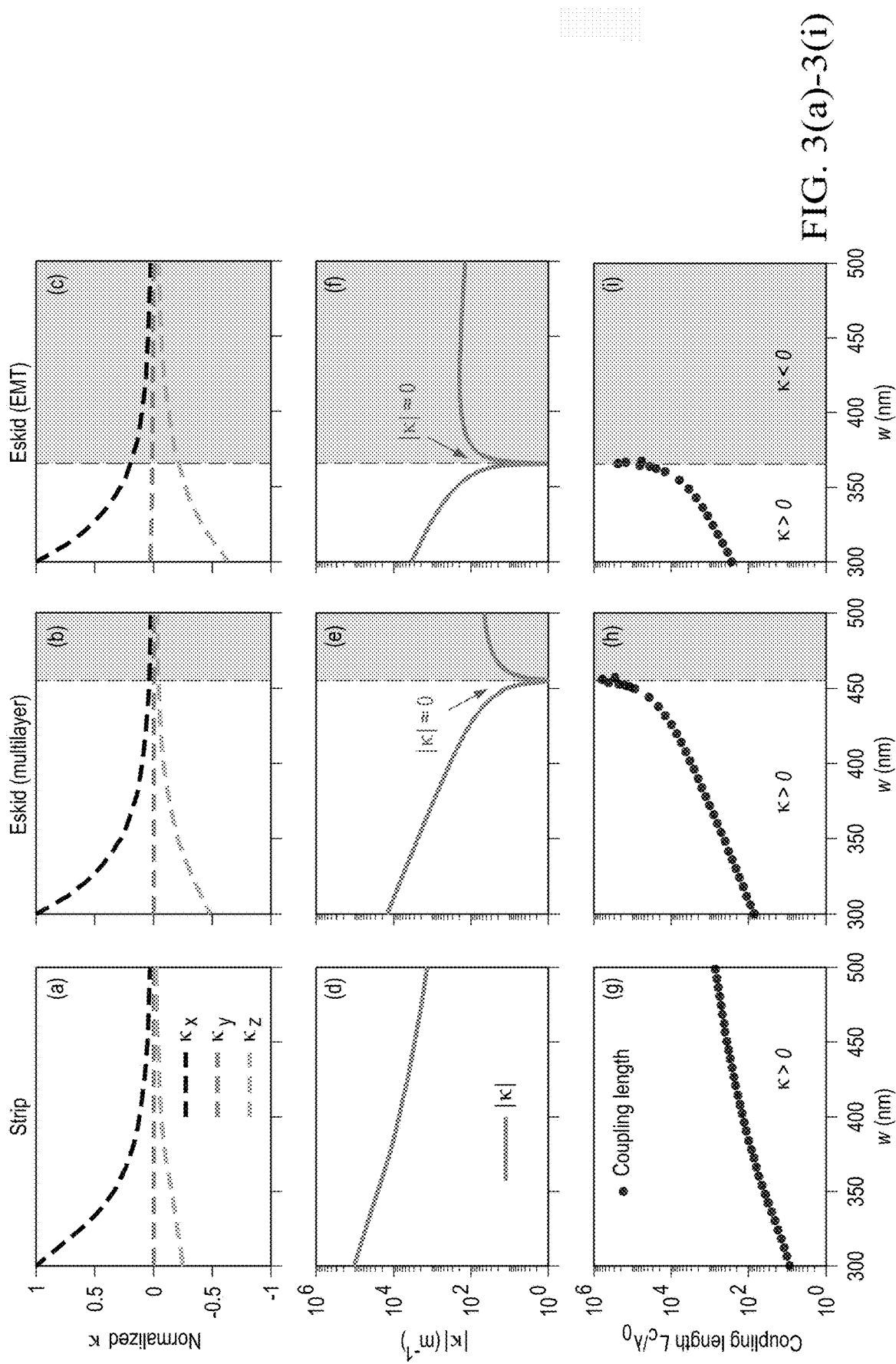
FIGS. 3(a)-3(c) depict normalized anisotropic coupling coefficients $\kappa_x$ (blue dashed), $\kappa_y$ (orange dashed), and $\kappa_z$ (yellow dashed) of the coupled (a) strip, (b) eskid with multilayer, and (c) eskid with EMT waveguides.
FIGS. 3(d)-3(f) depict the magnitude of the total coupling coefficient=|κ|=|$\kappa_x+\kappa_y+\kappa_z$| (orange solid) for each configuration: (d) strip, (e) eskid with multilayer, and (f) eskid with EMT waveguides.
FIGS. 3(g)-3(i) depict the corresponding normalized coupling lengths $L_c/\lambda_0=\pi/(2|\kappa|\lambda_0)$ (blue dots) for each configuration: (g) strip, (h) eskid with multilayer, and (i) eskid with EMT.

FIGS. 3(a)-3(g) illustrate the anisotropic coupled mode analysis on the exceptional coupling in coupled eskid waveguides. More specifically, FIGS. 3(a)-3(c) depict normalized anisotropic coupling coefficients $\kappa_x$ (blue dashed), $\kappa_y$ (orange dashed), and $\kappa_z$ (yellow dashed) of the coupled (a) strip, (b) eskid with multilayer, and (c) eskid with EMT waveguides. Geometric parameters and the wavelength are the same as in FIGS. 1(d)-1(f). FIGS. 3(d)-3(f) depict the magnitude of the total coupling coefficient $|\kappa|=\kappa_x+\kappa_y+\kappa_z|$ (orange solid) for each configuration: (d) strip, (e) eskid with multilayer, and (f) eskid with EMT waveguides. FIGS. 3(g)-3(i) depict the corresponding normalized coupling lengths $L_c/\lambda_0=\pi/(2|\kappa|/\lambda_0)$ (blue dots) for each configuration: (g) strip, (h) eskid with multilayer, and (i) eskid with EMT. The normalized coupling lengths in FIGS. 3(g)-3(i) that are obtained with anisotropic coupled mode analysis match with those results in FIGS. 1(g)-1(i) from the full numerical simulations. The red-shaded areas in (e, h) and (f, i) show the non-trivial coupling regimes where $\kappa<0$, which cannot be observed in typical strip waveguide coupling (d, g). The red vertically dashed lines in (e, h) and (f, i) indicate the exceptional coupling points where $|\kappa|\approx 0$, thus causing the $L_c\to\infty$ in ideal cases. As shown in (b) and (c), the anisotropic nature of eskid waveguides can cause a larger $\kappa_z$, which results in the non-trivial coupling regime ($\kappa<0$) and the exceptional coupling ($\kappa\approx 0$) at the transition point.

In every case, as the w increases, the coupling coefficients are reduced and the coupling lengths are increased, due to the higher light confinement in the core and less modal overlap between the two modes. In FIG. 3(a), the $\kappa_x$ is clearly more dominant than the other components, even with a non-negligible $\kappa_z$. The sign of $\kappa_z$ is negative due to the imaginary $E_z$, and it counteracts with the $\kappa_x$ in determining the $|\kappa|$. In typical coupled strip waveguides, the magnitude of $\kappa_x$ is always greater than that of $\kappa_z$ (i.e., $\kappa>0$) as the $E_x$ is dominant in the quasi-TE$_0$ mode. FIG. 3(d) shows the overall $|\kappa|$ with the actual unit, and its corresponding normalized coupling length in FIG. 3(g) exactly matches the result from the full numerical simulations in FIG. 1(g). In cases of eskids, there are non-trivial coupling regimes, where the magnitude of $\kappa_z$ is greater than that of $\kappa_x$ (i.e., $\kappa<0$) as shown in FIGS. 3(b) and 2(c); these regimes are red-shaded. These non-trivial coupling regimes in the coupled eskids are due to the anisotropic dielectric perturbations $\Delta\varepsilon_i$ of the scheme, allowing the $\kappa_z$ to compensate for the $\kappa_x$. Furthermore, the overall $|\kappa|$ approaches to zero at the transition points (red dashed lines in FIGS. 3(e) and 3(f)), resulting in infinitely long coupling lengths (i.e., $L_c\to\infty$) as shown in FIGS. 3(h) and 3(i); these results also match well with the full simulation results in FIGS. 1(h) and 1(i), respectively.

Figures 4A, 4B, 4C, 4D, 4E, 4F, 4G, 4H, 4I, 4J, 4K:
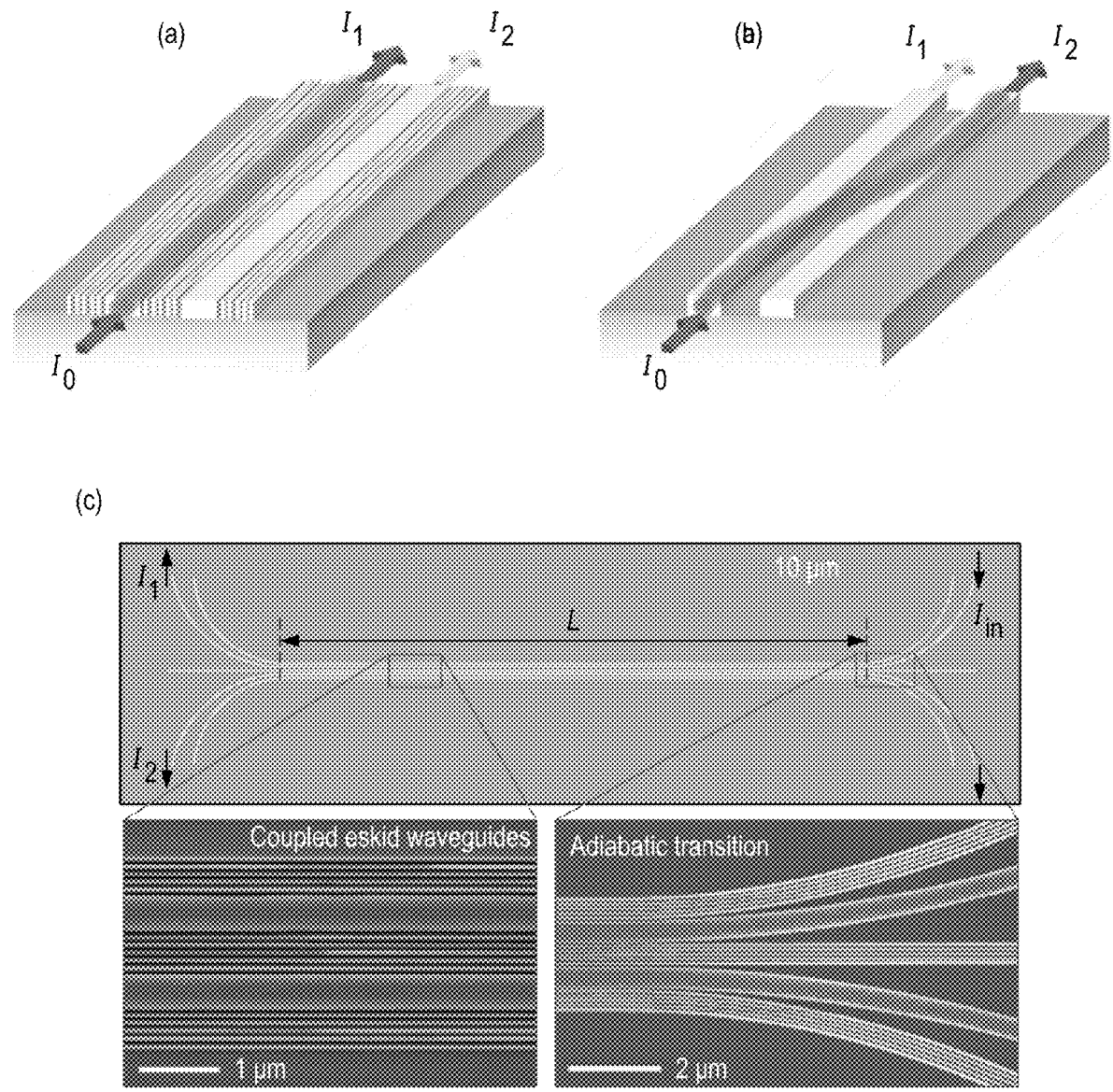
FIGS. 4(a)-4(b) are schematic views of the coupled (a) eskid (multilayer) and (b) strip waveguides.
FIG. 4(c) are SEM images of the fabricated devices in which the zoomed-in images show (left) the coupled eskid waveguides and (right) the adiabatic transition from strip to eskid waveguides.
FIG. 4(d) depicts the experimentally measured waveguide crosstalk and FIG. 4(e) depicts the corresponding normalized coupling length of the coupled eskid (solid) and strip (dashed) waveguides: w=420 nm (blue), 430 nm (orange), 440 nm (yellow), and 450 nm (purple)
FIG. 4(f) depicts the numerically simulated crosstalk and FIG. 4(g) depicts the normalized coupling length that corresponds to the experimental results in FIGS. 4(d) and (e), respectively.
FIGS. 4(h)-4(k) are map plots of the crosstalk as functions of 0.1 and wo for the coupled (h, i) eskid and (j, k) strip waveguides: (h, j) Experiment and (i, k) Simulation.
Figures 4A, 4B, 4C, 4D, 4E, 4F, 4G, 4H, 4I, 4J, 4K:
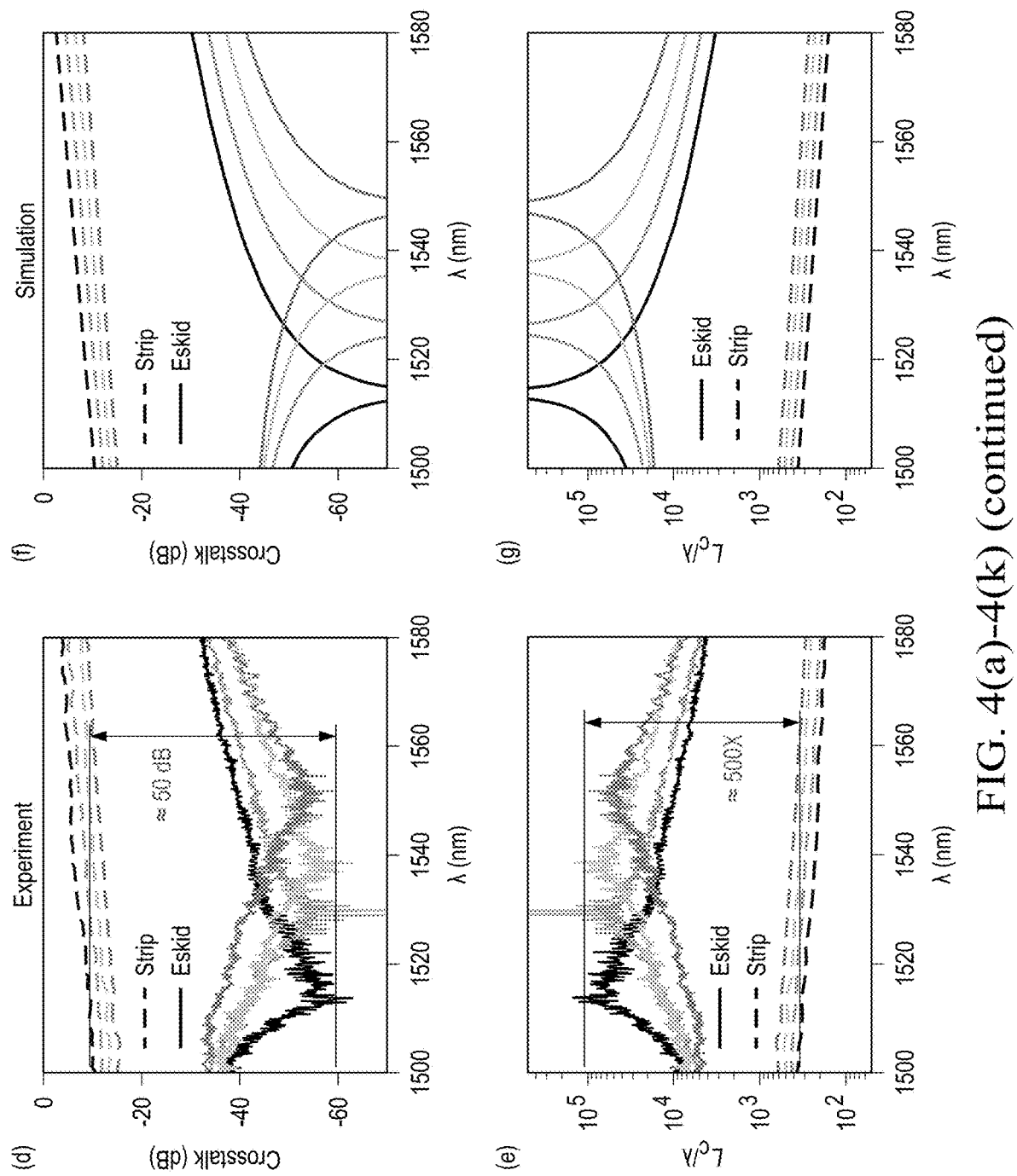
Figures 4A, 4B, 4C, 4D, 4E, 4F, 4G, 4H, 4I, 4J, 4K:
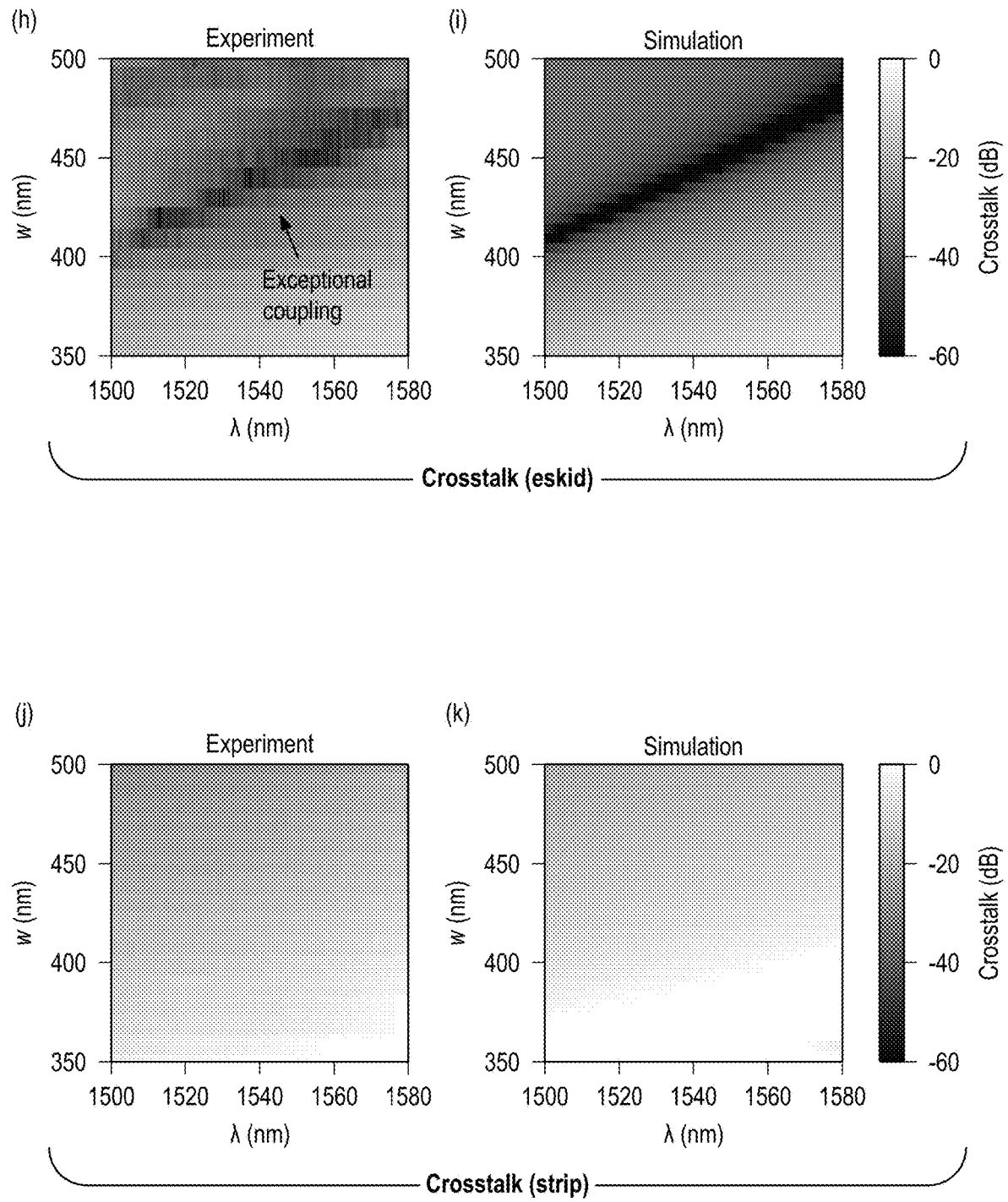

To confirm the theoretical findings, the coupled eskid (multilayer) and strip waveguides were fabricated, and the crosstalks of each configuration are measured and compared. FIGS. 4(a) and 4(b) show schematic views of the coupled eskid (multilayer) and strip waveguides, respectively, and FIG. 4(c) shows the SEM images of the fabricated devices: (top) wide-view of the scheme, (left) zoomed-in view of the coupled eskids, and (right) zoomed-in view of the adiabatic transition region from strip to eskid waveguides (see FIGS. 5(a)-5(d) below. The $I_0$ indicates the optical power at the input port, and the $I_1$ and $I_2$ are the output powers at the through and coupled ports, respectively. The waveguide crosstalk is defined as the power ratio $I_2/I_1$ and it is related to the coupling length $L_c$, following [52], $$\frac{I_2}{I_1} = \tan^2\left(\frac{\pi L}{2L_c}\right) \quad (6)$$

where L is the physical length of the coupled waveguides. To measure the waveguide crosstalk, a light signal was sent to the input port $I_0$ through a fiber-coupled grating coupler, then output signals $I_1$ and $I_2$ were measured simultaneously. FIG. 4(d) shows the experimentally measured waveguide crosstalk ($I_2/I_1$ in dB) and FIG. 4(e) is the corresponding normalized coupling length using Eq. (6). Solid and dashed lines are the cases of the coupled eskid and strip waveguides, respectively, and each color represents different core widths when w=420 nm (blue), 430 nm (orange), 440 nm (yellow), and 450 nm (purple). FIGS. 4(f) and 4(g) are the simulation results that correspond to FIGS. 4(d) and 4(e), respectively. Note that the dips in the crosstalk and the peaks in the $L_c/\lambda$ correspond to the exceptional couplings. In FIG. 4(d), notice that the crosstalks of the coupled eskids are suppressed down to about −60 dB, which is approximately 50 dB lower than that of the standard strip waveguides. In terms of the coupling length, the peak $L_c/\lambda$ of the coupled eskids are in the order of $10^5$, which is approximately 500 times longer than that of the strip waveguides. As shown in FIGS. 4(f) and 4(g), in an ideal case of exceptional coupling, the crosstalk can be suppressed completely with an infinitely long coupling length. Geometric parameters are h=220 nm, $\rho=0.5$, $\Lambda=100$ nm, N=5, and L=100 µm. However, in real experiments, the minimum crosstalk is limited by the scattering from the waveguide sidewall roughness and the cross-coupling efficiency at the transition between strip to eskid waveguides. Still, the waveguide crosstalk that was achieved here is extremely low, and, it is believed that these results demonstrate the longest waveguides coupling length, spanning about $10^5$ of free-space wavelengths. The full map plots of the waveguide crosstalk, as functions of 0.1 and w, for the coupled eskid and strip waveguides are plotted in FIGS. 4(h, i) and 4(h, i), respectively, clearly showing much lower crosstalk with the eskid waveguides. FIGS. 4(h, j) and 4(i, k) are the experimental (Exp) and simulation (Sim) results, respectively. The dark regions in FIGS. 4(h, i) indicate the exceptional coupling, which can be observed only with the eskid waveguides. Since the exceptional coupling occurs at the point where the coupling coefficient $\kappa_z$ compensates the $\kappa_x$, the exceptional coupling point can be engineered by controlling the modal overlaps between the two waveguides. For example, as shown in FIGS. 4(h, i), increasing the wo shifts the exceptional coupling point to a longer wavelength; this is because a wider wo increases the light confinement and reduces the modal overlap between the two coupled eskids, while increasing a wavelength works the opposite way. Similarly, changing the other geometric parameters h, g, and ρ shifts the exceptional coupling point, and it was also observed exceptional couplings with different numbers of eskid layers N and filling fraction ρ (FIGS. 6(a)-6(c) below). It is worth noting that, even without the exceptional coupling, the crosstalk of the eskid is lower than that of strip waveguides, due to the reduced skin-depth of the evanescent waves [41]. In this case, the minimum crosstalk limit was significantly pushed further by hitting the exceptional coupling point.

Figures 5A, 5B, 5C, 5D:
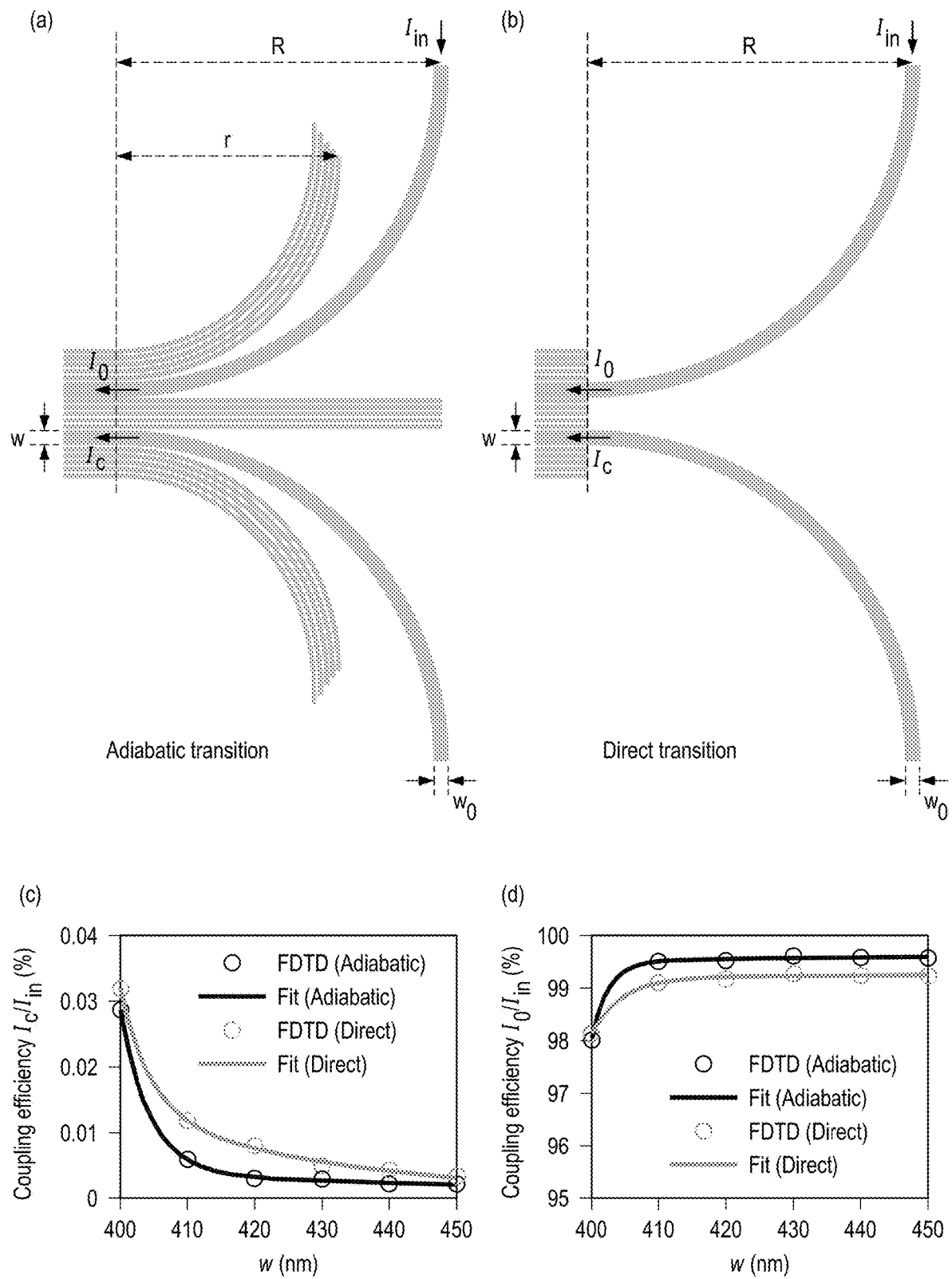
FIGS. 5(a)-5(b) are schematics of the strip-to-eskid mode transition region: (a) Adiabatic and (b) Direct transitions.
FIGS. 5(c)-5(d) depict simulated power coupling efficiencies of (c) $I_c/I_{in}$ and (d) $I_0/I_{in}$ as a function of w for adiabatic (blue) and direct (orange) transitions.

FIG. 5(a) illustrate strip-to-eskid interface optimization. More specifically, FIGS. 5(a)-5(b) are schematics of the strip-to-eskid mode transition region: (a) Adiabatic and (b) Direct transitions. The bending radii are R=20 μm and r=15 μm, respectively. The core width at the input strip waveguide is fixed to $w_0$=450 nm, while the core width of the eskid is varied w=400-450 nm. The core width is adiabatically tapered through the bending. $I_{in}$ is the input power at the strip waveguide, whereas $I_0$ and $I_c$ are the powers at the through and coupled ports of the eskid. FIGS. 5(c)-5(d) depict simulated power coupling efficiencies of (c) $I_c/I_{in}$ and (d) $I_0/I_{in}$ as a function of w for adiabatic (blue) and direct (orange) transitions. Circles indicate the full 3D FDTD simulation results and solid lines are their fitting curves. Notice that the adiabatic transition reduces the coupling efficiency $I_c/I_{in}$ close to $10^{-5}$. This allowed the extremely low waveguide crosstalk in the experiment to be measured.

To measure the waveguide crosstalk at the extremely low power level, the interface crosstalk at each port should be lower than the waveguide crosstalk. When measuring waveguide crosstalk above −40 dB, one may use a direct strip-to-eskid coupling as shown in FIG. 5(b) [41, 54]. However, in this case, the power level of the waveguide crosstalk due to the exceptional coupling is below −40 dB and an additional transition scheme is required. FIGS. 5(a) and 5(b) show the strip-to-eskid interface schemes with adiabatic and direct transitions, respectively. R is the bending radius of the waveguide core and r is the banding radius of the metamaterial multilayers. The powers at the input strip, throughput eskid, and coupled eskid waveguides are denoted by $I_{in}$, $I_0$, and $I_c$, respectively. The core width at the input strip waveguide was fixed to $w_0$=450 nm and the core width of eskid waveguide w is varied from 400 nm to 450 nm. Through the bending, the core width is tapered adiabatically. FIGS. 5(c) and 5(d) are the full 3D FDTD simulation results showing the coupling efficiencies for $I_c/I_{in}$ and $I_0/I_{in}$, respectively, with the banding radii of R=20 μm and r=15 μm. Blue and orange circles are the coupling efficiencies of the adiabatic and direct transition schemes, respectively, and solid lines are their fitting curves. Since the exceptional couplings are observed at the power level below −40 dB, the coupling efficiency $I_c/I_{in}$ should be less than $10^{-4}$. With the direct transition, the coupling efficiency $I_c/I_{in}$ is at the border-line of $10^{-4}$ and the exceptional coupling phenomena were not seen clearly (i.e., too shallow dips). However, with the adiabatic transition as in FIG. 5(c), the coupling efficiency $I_c/I_{in}$ has been suppressed further down to $10^{-5}$ and the exceptional coupling phenomena were observed clearly as shown in FIG. 4.

Figures 6A, 6B, 6C:
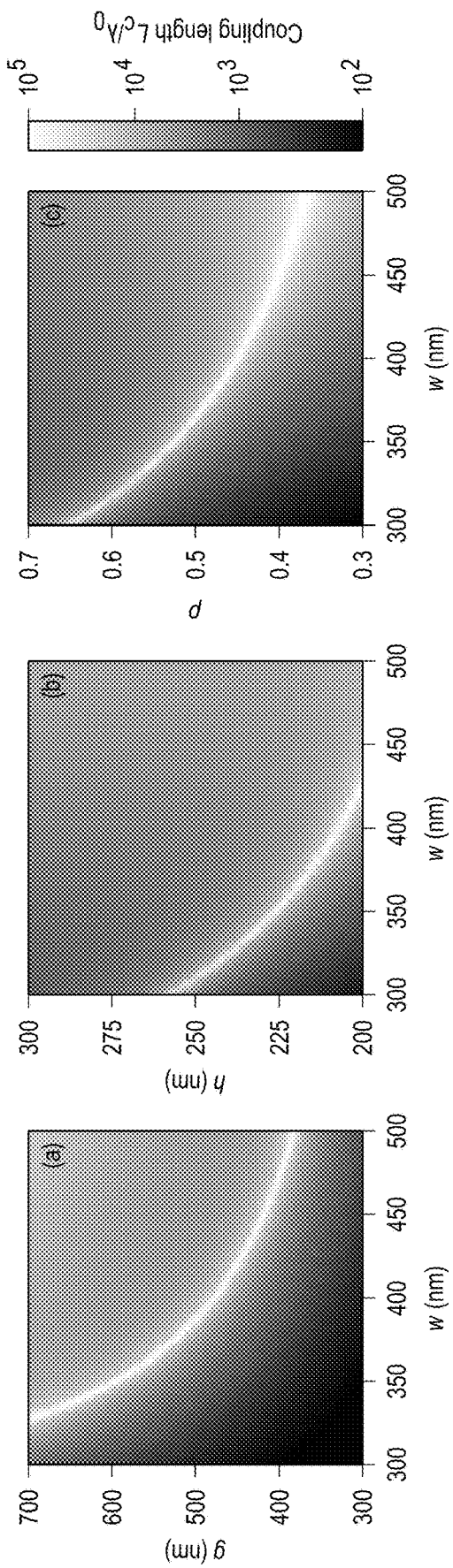
FIGS. 6(a)-6(c) depict normalized coupling lengths $L_c/\lambda_0$ of the coupled EMT eskid waveguides as functions of (a) w and g, (b) w and h, and (c) w and ρ.

FIGS. 6(a)-6(c) illustrate parametric studies on the exceptional coupling. As the exceptional coupling exists near the $|\kappa_x| \approx |\kappa_z|$, which is determined by the anisotropic dielectric perturbation and the modal overlap, changing the filling fraction ρ and geometric parameters w, g, and h would shift the exceptional coupling point. In other words, these parameters would work as tuning knobs to engineer the exceptional coupling points. To explore the engineering capability of the exceptional coupling, full parametric simulations were conducted on the coupled eskid configuration with EMT. FIGS. 6(a)(-c) show the calculated $L_c/\lambda_0$ map plots as functions of (a) w and g, (b) w and h, and (c) w and ρ, respectively. Other parameters are set to h=220 nm, ρ=0.5, g=550 nm, and $\lambda_0$=1550 nm, unless otherwise specified. In FIG. 6(a), it is noted that, as the g reduces, the exceptional coupling appears at a wider w. This is due to the similar trend in g and w for the modal overlap; as the g reduces, there will be more modal overlap due to the proximity, while there will be less modal overlap as the w increases due to the higher light confinement. The reduced modal overlap due to the increased w compensates for the increased modal overlap due to the reduced g, shifting the exceptional coupling point. Changing the h of the scheme would show a similar effect as the g and w, as increasing the h allows for a higher confinement, thus less modal overlap. To compensate for the reduced modal overlap due to the increased h, the w should be narrower. This trend is clearly shown in FIG. 6(b). Changing the ρ is more complicate than changing other parameters, as it simultaneously modifies both $\varepsilon_\perp$ and $\varepsilon_k$. However, within the range of this evaluation, the anisotropy increases as ρ increases and the effect of anisotropic dielectric perturbation becomes more dominant. Thus, the $\kappa_z$ with a higher ρ can compensate for the $\kappa_x$ at a larger modal overlap, which is a narrower w. This trend is also clearly shown in FIG. 6(c).

In summary, exceptional coupling phenomena in the coupled eskid waveguides have been presented that can achieve extremely low waveguide crosstalk. The coupled mode analysis reveals that the unique anisotropic dielectric perturbation of the eskid waveguide is the fundamental origin of the non-trivial coupling regime that can cause the exceptional coupling at the transition point. It was experimentally demonstrated the exceptional couplings on an SOI platform, which is low-loss, low-cost, and compatible with the CMOS foundry. With the exceptional coupling, the waveguide crosstalk was suppressed approximately 50 dB lower than the case of strip waveguides, which corresponds to an approximately 500 times longer coupling length compared to the case of strip waveguides. The exceptional coupling can be easily engineered with geometric parameters of the waveguide cross-section and the filling fraction of the metamaterials. This approach of using the exceptional coupling in the anisotropic eskid waveguides drastically increase the photonic chip integration density and can be applied to various photonic devices realizing ultracompact photonic devices and highly dense PICS.

Methods

Numerical simulation. A commercially available software (Lumerical Mode Solution) was used to calculate the effective refractive indices of the coupled symmetric and antisymmetric modes. For the implementation of an ideal metamaterial cladding, the EMT was used for the $\varepsilon_x = \varepsilon_\perp$ and $\varepsilon_y = \varepsilon_z = \varepsilon_k$, following Eq. (1). For the strip-to-eskid adiabatic transition, a full 3D FDTD simulation was used to minimize the cross-coupling efficiency as described below.

Figures 7A, 7B, 7C, 7D, 7E, 7F, 7G, 7H:
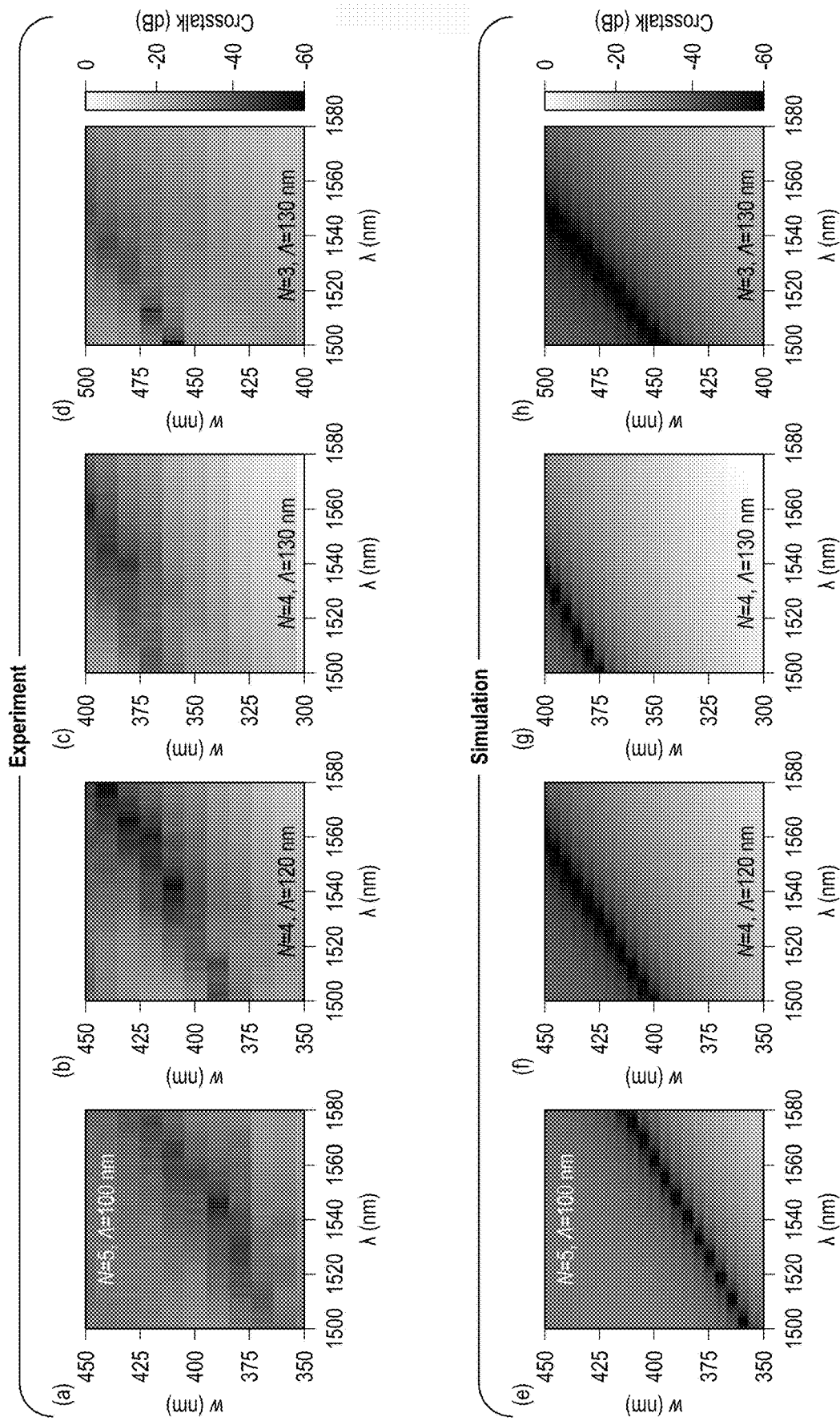
FIGS. 7(a)-(d) show the crosstalk map plots as functions of λ and w for different geometries: (a) N=5, Λ=100 nm, Λ(1−ρ)=40 nm, (b) N=4, Λ=120 nm, Λ(1−ρ)=50 nm, (c) N=4, Λ=130 nm, Λ(1−ρ)=50 nm, and (d) N=3, Λ=130 nm, Λ(1−ρ)=50 nm.
FIGS. 7(e)-(h) are the simulation results that correspond to FIGS. 7(a)-(d)

As shown in FIGS. 7(a)-7(h), the exceptional coupling can be engineered with geometric parameters that determine the modal overlap and the anisotropic dielectric perturbation. In cases of the practical eskid waveguides with sub-wavelength-scale multilayers, the number of eskid layers N and the periodicity Λ determine the gap g between the two eskid waveguides, and the ratio of the multilayer width Λρ and gap Λ(1−ρ) define the filling fraction ρ. For the practical implementation of the eskid waveguide, the minimum feature size limits the gap size of multilayers Λ(1−ρ) to be larger than 40 nm. Considering these limitations, it was also demonstrated exceptional couplings with different sets of N and ρ. FIGS. 7(a)-(d) show the crosstalk map plots as functions of 0.1 and w for different geometries: (a) N=5, Λ=100 nm, Λ(1-ρ)=40 nm, (b) N=4, Λ=120 nm, Λ(1-ρ)=50 nm, (c) N=4, Λ=130 nm, Λ(1-ρ)=50 nm, and (d) N=3, Λ=130 nm, Λ(1-ρ)=50 nm. Note that the filling fractions of each case are (a) ρ=0.6, (b) ρ=0.583, (c) ρ=0.615, and (d) ρ=0.615. FIGS. 7(e)-(h) are the simulation results that correspond to FIGS. 7(a)-(d). Notice that, in FIGS. 7(a) (ρ=0.6), the exceptional coupling appears at a narrower w compared to the case of FIG. 4(h) (ρ=0.5). The increased p introduces a higher anisotropic dielectric perturbation, allowing the $\kappa_z$ to compensate for $\kappa_x$ at a larger modal overlap, i.e., a narrower w. This trend is consistent with the parametric analysis in FIG. 6(c). A similar trend is shown between FIGS. 7(b) and 7(c); the ρ=0.615 of FIG. 7c) is higher than ρ=0.0.583 of FIG. 7(b), shifting the exceptional coupling point to a narrower w. The g of FIG. 7(c) is also slightly larger (Δg=40 nm) than that of FIG. 7(b), having the same effect, i.e., a narrower w. To separately observe the effect of g, the devices were tested with the N=3 in FIG. 7(d). Note that, between FIGS. 7(c) and 7(d), the only difference is N while the other parameters are the same. Thus, the results in FIG. 7(d) can be viewed as the case of a reduced g while fixing the other parameters. It is clearly seen that, with a reduced N (thus, a reduced g), the exceptional coupling appears at a wider w. Reducing the g increase the modal overlap, thus a wider w (i.e., a higher confinement) is required to compensate for the increased modal overlap. Again, this is consistent with the parametric studies in FIG. 6(a).

Coupled mode analysis. For the coupled mode analysis in FIG. 3, the Ki of Eq. (3) was calculated by taking the separate electric fields distributions $E_{1i}$ and $E_{2i}$ of an isolated waveguide 1 and 2, respectively. A dielectric perturbation between the two separate waveguides was obtained for each component $\Delta_{\epsilon i}$, which plays a significant role in realizing the exceptional coupling. Each coupling coefficient Ki was added together to form the total coupling coefficient |κ|, and Eq. (5) was used to calculate the corresponding coupling length.

Device fabrication. The photonic chips were fabricated on an SOI wafer (220 nm thick Si on a 2 μm SiO$_2$) using the JEOL JBX-6300 EBL system, which operated at 100 KeV energy, 400 pA beam current, and 500 μm×500 μm exposure field. A solvent rinse was done, followed by 5 min of O$_2$ plasma treatment. Hydrogen silsequioxane resist (HSQ, Dow-Corning XR-1541-006) was spin coated at 4000 rpm and pre-exposure baked on a hotplate at 90° for 5 min. Shape placements by the machine grid, the beam stepping grid, and the spacing between dwell points during shot shape writing were 1 nm, 4 nm, and 4 nm, respectively. An exposure dose of 1460 μC/cm$^2$ was used. The resist was developed in 25% tetramethylammonium hydroxide (TMAH) for 4 min followed by a flowing deionized waster rinse for 60 s and an isopropanol rinse for 10 s. Then, nitrogen was blown to air dry. After development of the resist, the unexposed top silicon layer was etched by a Cl$_2$/O$_2$ in a reactive ion-plasma etching tool (Trion Minilock) to transfer the pattern from the resist to the silicon layer.

Device characterization. The photonic chips were characterized by a custom-built grating coupler setup. An angle polished(8°) eight-channel fiber array was used to couple light in and out of the grating couplers. The fiber array was mounted on a five-axis stage with a high-precision adjuster with 20 nm sensitivity in XYZ direction. A Keysight Tunable Laser 81608A was used as the source and a Keysight N7744A optical power meter with InGaAs sensors was used as the output detector. The wavelength was swept from 1500 to 1580 nm with a step of 100 μm. A polarization controller was used to control the polarization of the input laser light.

Further analysis. In this example, it is shown that there exists an exceptional coupling point in the coupled eskid waveguides where the crosstalk can be suppressed completely in an ideal case. The coupled mode analysis reveals that the anisotropic dielectric perturbation of the metamaterial cladding causes a non-trivial coupling regime, where the modal index of the anti-symmetric mode is higher than that of the symmetric mode. An exceptional coupling appears at the transition point to this non-trivial coupling regime and results in an infinitely long coupling length, i.e., complete suppression of the waveguide crosstalk.

Figures 8A, 8B, 8C:
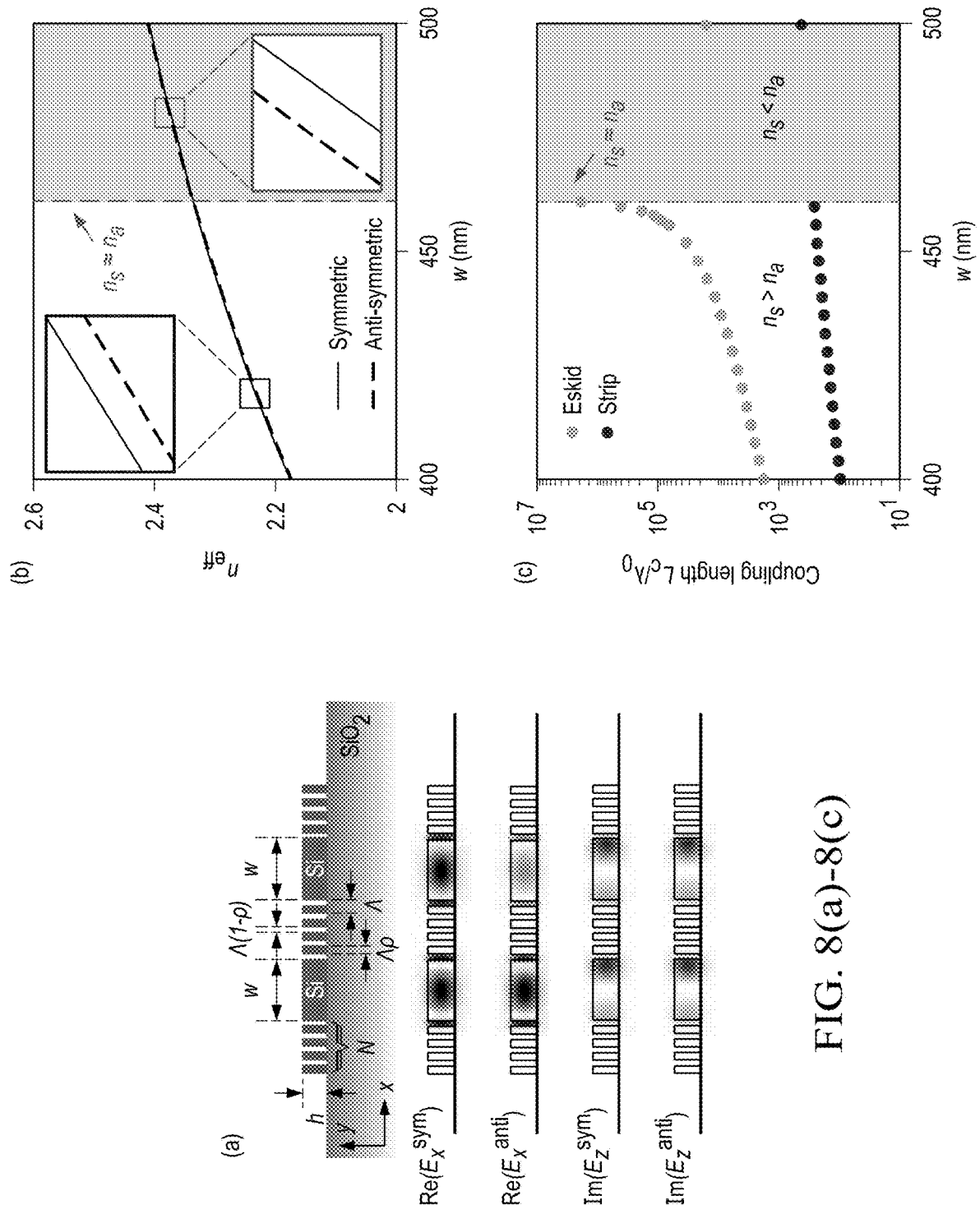
FIG. 8(a) depicts schematic cross-section and electric field profiles (real $E_x$ and imaginary $E_z$ of the symmetric and anti-symmetric modes) of the coupled extreme skin-depth (eskid) waveguides with subwavelength multilayer claddings.
FIG. 8(b) depicts numerically simulated effective refractive indices of the symmetric $n_s$ (yellow solid) and anti-symmetric $n_a$ (blue dashed) modes.
FIG. 8(c) depicts the corresponding normalized coupling length $L_c/\lambda_0=1/(2|n_s-n_a|)$.

FIG. 8(a) shows the schematic cross-section and electric field profiles (real $E_x$ and imaginary E of the symmetric and anti-symmetric modes) of the coupled extreme skin-depth (eskid) waveguides with subwavelength multilayer claddings. The coupled eskids are designed on an SOI platform, i.e., silicon (Si) and silica (SiO$_2$) as the core and cladding, respectively. The coupling of the fundamental quasi-TE (TE$_0$) mode is explored, and its modal field profiles are also plotted in FIG. 8(a); from top to bottom, the real component of E for symmetric and anti-symmetric modes and imaginary component of $E_z$ for symmetric and anti-symmetric modes. Geometric parameters are set to h=220 nm, Λ=100 nm, ρ=0.5, and N=4, considering the minimum feature size of 50 nm for the practical fabrication. FIG. 8(b) shows the simulated effective refractive indices of the coupled symmetric $n_s$ (yellow solid) and anti-symmetric $n_a$ (blue dashed) modes as a function of core width w, and FIG. 8(c) shows the corresponding normalized coupling length (blue dots), following $L_c/\lambda_0=1/(2|n_s-n_a|)$ [52]. Coupling length defines the minimum length that fully transfers optical power from one waveguide to another and quantifies the crosstalk; i.e., a shorter coupling length means higher crosstalk, and it's the opposite for a longer coupling length. The inset boxes in FIG. 8(b) show the zoomed-in views of ns and $n_a$. Notice that, there is a non-trivial coupling regime (red-shaded) where the effective index of the anti-symmetric mode is higher than that of the symmetric mode (i.e., $n_s<n_a$). The red dashed line indicates the transition point to the non-trivial coupling regime, and the indices of the symmetric and anti-symmetric modes cross each other at this point (i.e., $n_s \approx n_a$), which results in an infinitely long coupling length (i.e., $L_c \rightarrow \infty$). Note that, the coupling length is inversely proportional to the index difference between the symmetric and anti-symmetric modes, and the coupling length approaches infinity at this transition point as shown in FIG. 8(c). For a comparison, the normalized coupling length of coupled strip waveguides without metamaterial multilayers is also plotted with black dots.

Figures 9A, 9B, 9C:
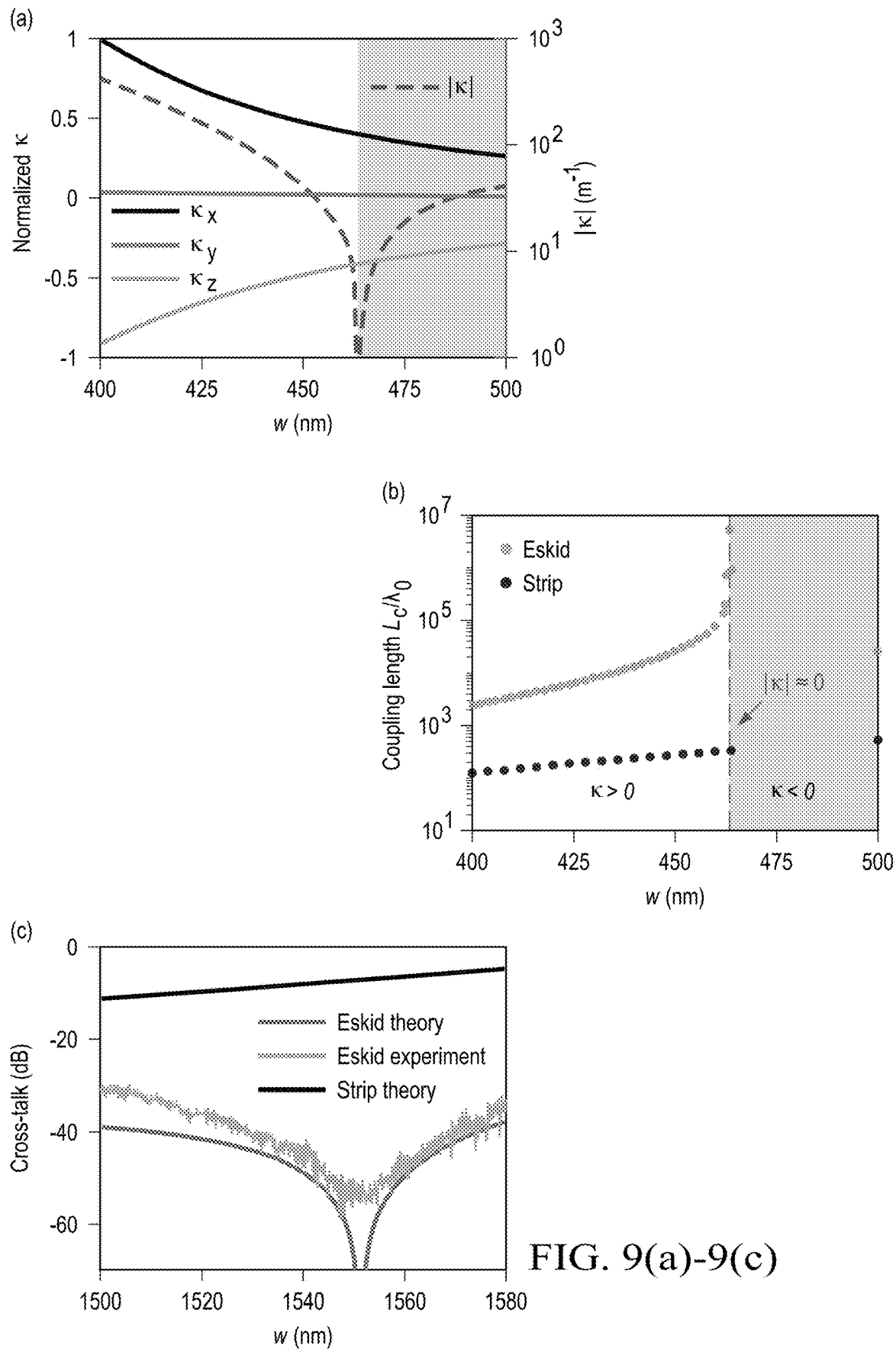
FIG. 9(a) depicts normalized coupling coefficients $\kappa_x$ (blue), $\kappa_y$ (orange), and $\kappa_z$ (yellow) of the coupled eskid waveguides (left y-axis) and the corresponding magnitude of the total coupling coefficient $|\kappa|=|\kappa_x+\kappa_y+\kappa_z|$ (red dashed, right y-axis)
FIG. 9(b) depicts normalized coupling lengths $L_c/\lambda_0=\pi/(2|\kappa|\lambda_0)$ (blue dots)
FIG. 9(c) depicts the crosstalk of the coupled eskid waveguides as a function of wavelength (w=460 nm and L=100 μm): experiment (orange) and theory (blue)

FIG. 9(a) shows the normalized coupling coefficients $\kappa_x$ (blue solid), $\kappa_y$ (orange solid), and $\kappa_z$ (yellow solid) for the same geometries of FIG. 8. Note that, due to the anisotropic nature of metamaterial claddings, dielectric perturbations are different for each component (i.e., $\Delta\epsilon_x 6=\Delta\epsilon_y=\Delta\epsilon_z$) and $|\kappa_z|$ can be greater than $|\kappa_x|$ (red-shaded). Since E is purely imaginary while E is purely real, the sign of $\kappa_z$ is the opposite of $\kappa_x$ and counteractive in determining the overall coupling coefficient $|\kappa|=|\kappa_x+\kappa_y+\kappa_z|$. The red dashed line in FIG. 9(a) shows the overall K (right axis, unit: m$^{-1}$) and there is an exceptional coupling point where $\kappa_z$ compensates for $\kappa_x$ to achieve $|\kappa|\approx0$. The coupling length of the coupled mode analysis can be obtained by $L_c=\pi/(2|\kappa|)$ [52] and is plotted with blue dots in FIG. 9(b). The black dots are the case of strip waveguides as a comparison. Again, the coupling length of the coupled eskid waveguides approaches infinity ($L_c \to \infty$) at the exceptional coupling point. The exceptional coupling results in FIG. 9(b) through the coupled mode analysis match well with those in FIG. 8(c) from the full numerical simulations. The exceptional coupling in FIG. 9(c) was also experimentally demonstrated; the blue and orange lines are the simulated and experimentally measured crosstalk spectrum, respectively, and the dips in the crosstalk near the 1550 nm correspond to the exceptional coupling. The black line is the case of coupled strip waveguides.

Figure 10:
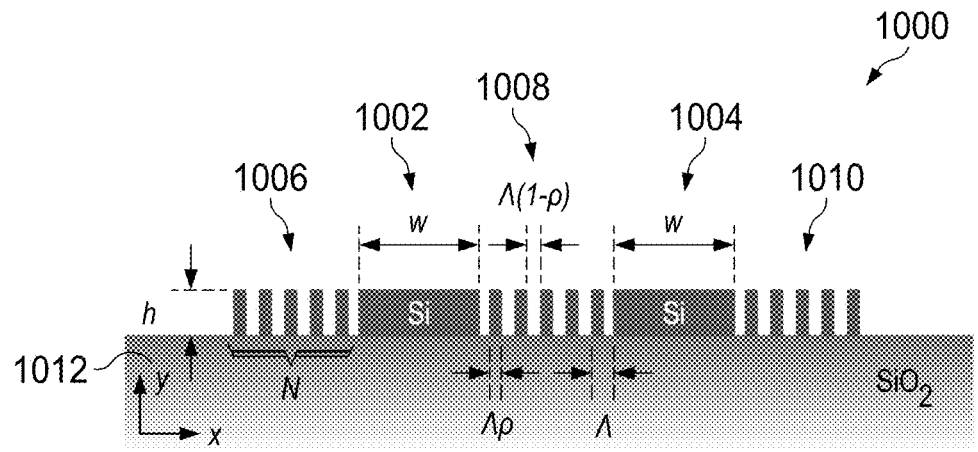
FIG. 10 depicts an optical waveguide 1000 in accordance with one embodiment of the present invention.

FIG. 10 depicts an optical waveguide 1000 in accordance with one embodiment of the present invention. The optical waveguide 1000 includes a first waveguide core 1002, a second waveguide core 1004, a first subwavelength multilayer cladding 1006, a second subwavelength multilayer cladding 1008 and a third subwavelength multilayer cladding 1010 disposed on a substrate 1012. The first waveguide core 1002 and the second waveguide core 1004 have a width (w) and a height (h). The first waveguide core 1002 is disposed between the first subwavelength multilayer cladding 1006 and the second subwavelength multilayer cladding 1008. The second waveguide core 1004 is disposed between the second subwavelength multilayer cladding 1008 and the third subwavelength multilayer cladding 1010. Each subwavelength multilayer cladding 1006, 1008, 1010 has a number (N) of alternating subwavelength ridges having a periodicity ($\Lambda$) and a filling fraction ($\rho$). A total coupling coefficient ($|\kappa|$) of the first waveguide core 1002 and the second waveguide core 1004 is from 10 to 0.

Figures 12A, 12B, 12C, 12D, 12E:
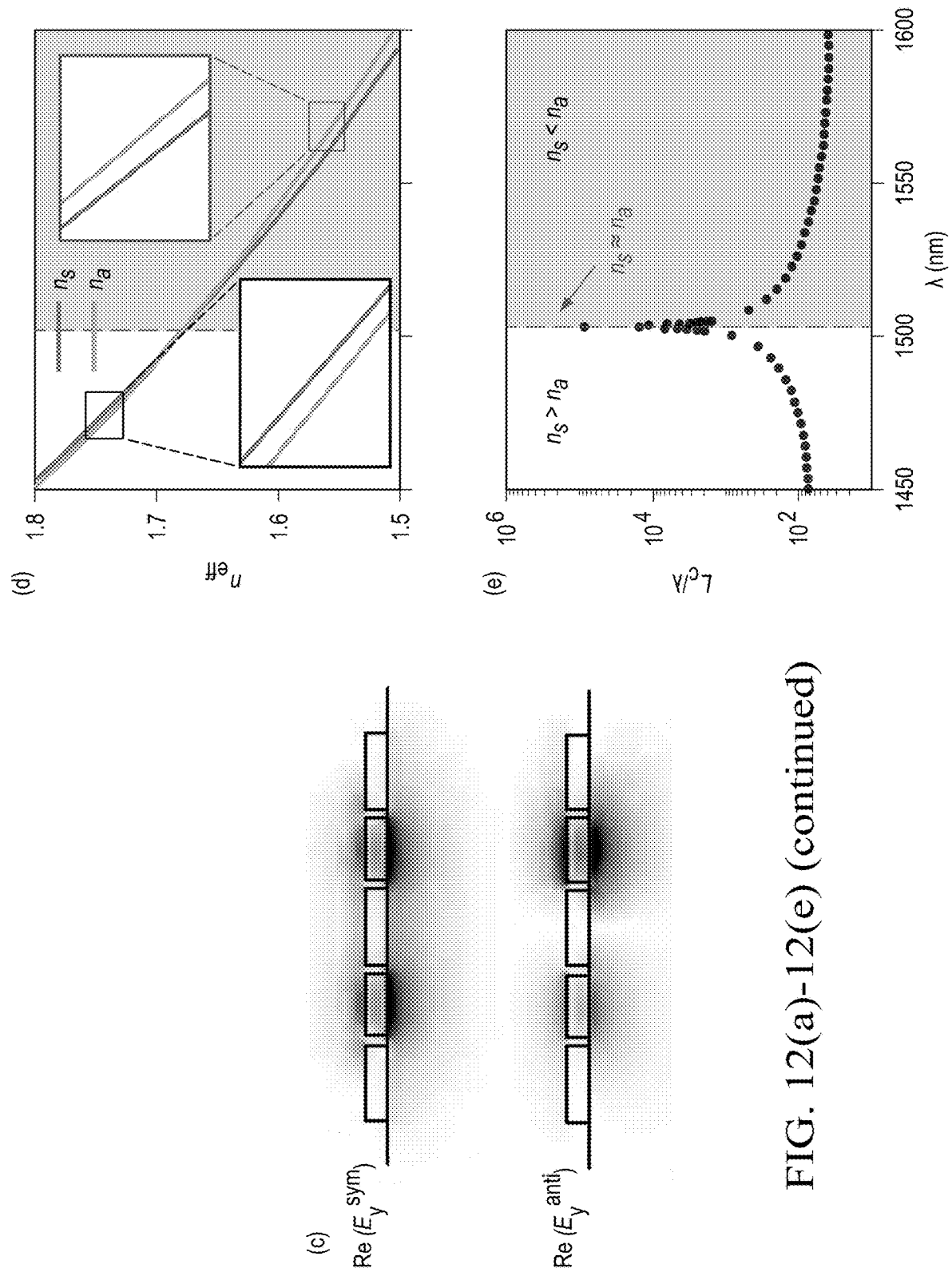
FIGS. 12(a)-12(b) depict (a) top and (b) perspective views of a coupled perpendicular extreme skin-depth (perpendicular-eskid) waveguide for exceptional coupling in $TM_0$ modes in accordance with another embodiment of the present invention.
FIG. 12(c) depicts electric field profiles ($Re[E_y]$) of the coupled symmetric ($E_y^{sym}$, upper) and anti-symmetric ($E_y^{anti}$, lower) $TM_0$ modes, respectively, corresponding to FIGS. 12(a)-(b)
FIGS. 12(d)-12(e) depict (d) numerically simulated effective refractive indices of the $TM_0$ symmetric $n_s$ (solid blue) and anti-symmetric $n_a$ (solid orange) modes, and (e) their corresponding normalized coupling length (dotted blue) corresponding to FIGS. 12(a)-(b)
Figures 13A, 13B, 13C, 13D, 13E:
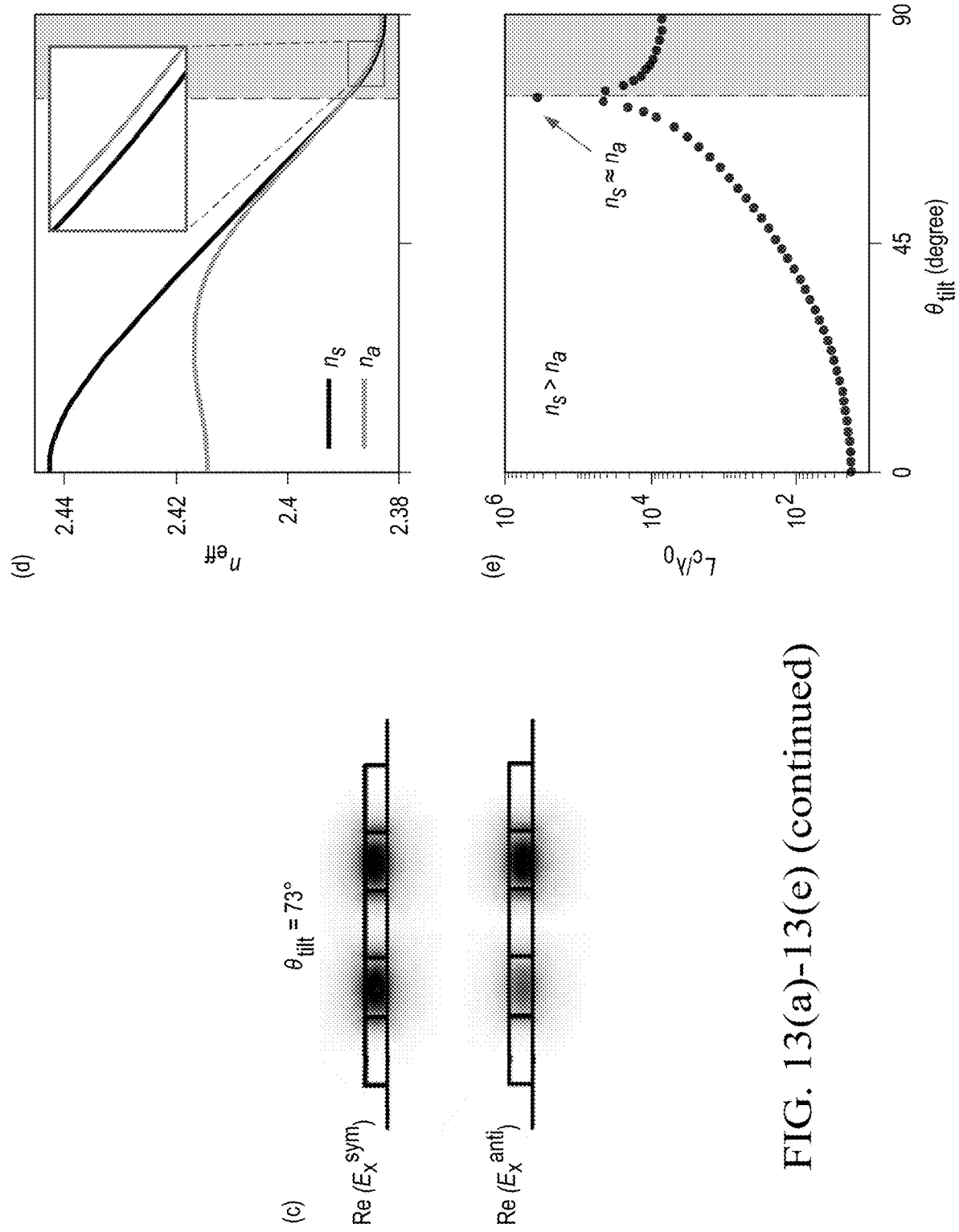
FIGS. 13(a)-13(b) depict (a) top and (b) perspective views of a coupled tilted extreme skin-depth (tilted-eskid) waveguide for broadband exceptional coupling in $TE_0$ modes in accordance with another embodiment of the present invention.
FIG. 13(c) depicts electric field profiles ($Re[E_x]$) of the coupled symmetric ($E_x^{sym}$, upper) and anti-symmetric ($E_x^{anti}$, lower) $TE_0$ modes, respectively, corresponding to FIGS. 13(a)-(b)
FIGS. 13(d)-13(e) depict numerically simulated effective refractive indices as a function of tilted angle $\theta_{tilt}$ for the $TE_0$ symmetric $n_s$ (sloid blue) and anti-symmetric $n_a$ (solid orange) modes, and (e) their corresponding normalized coupling length (dotted blue) corresponding to FIGS. 13(a)-(b)
Figures 14A, 14B:
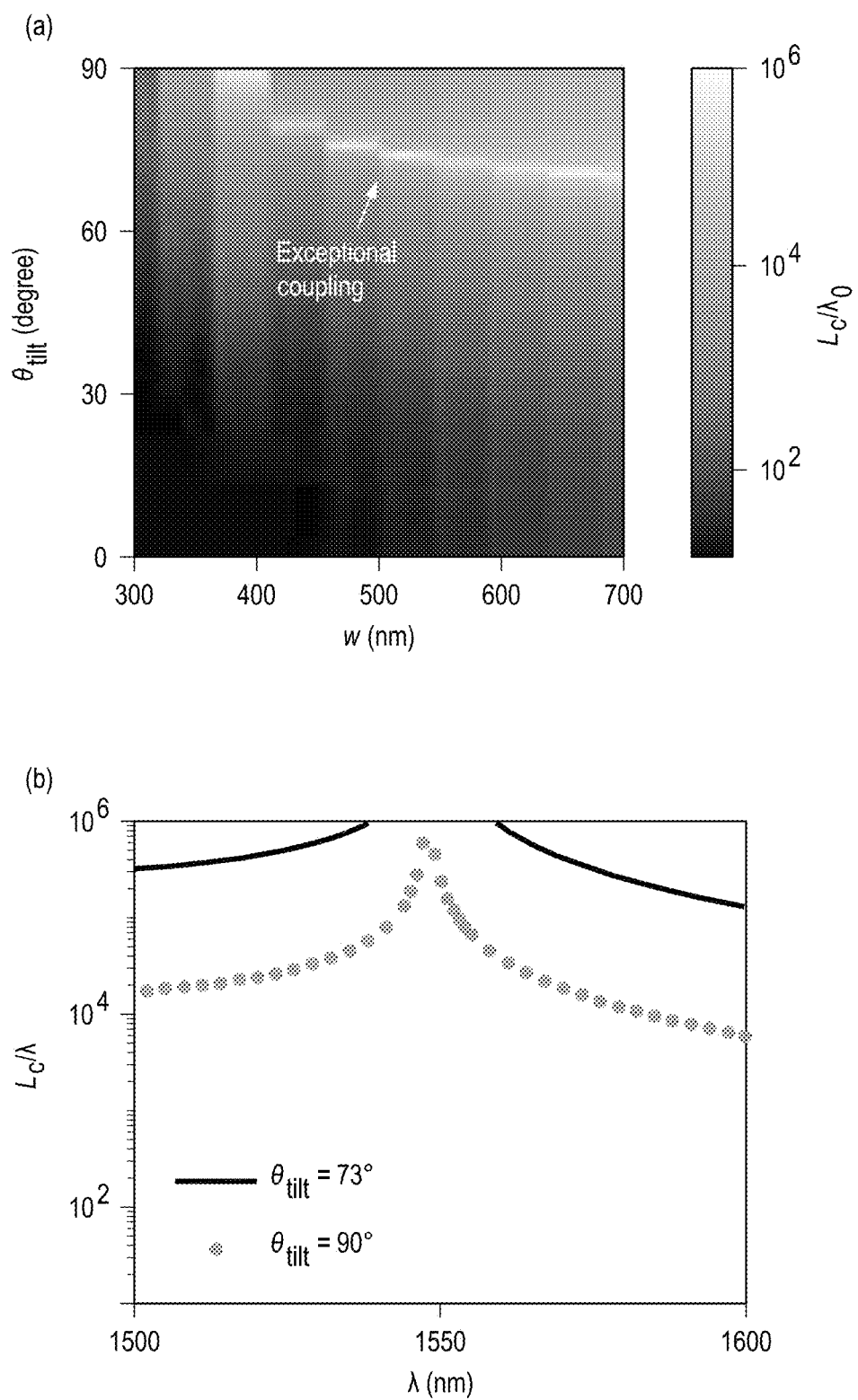
FIG. 14(a) depicts simulated normalized coupling length map as functions of tilted angle $\theta_{tilt}$ and core width w of broadband exceptional coupling with tilted-eskid waveguides in accordance with another embodiment of the present invention.
FIG. 14(b) depicts normalized coupling lengths of the tilted-eskid waveguides when $\theta_{tilt}$=73 deg and w=550 nm (blue solid line) of broadband exceptional coupling with tilted-eskid waveguides in accordance with another embodiment of the present invention.

In one aspect, the total coupling coefficient ($|\kappa|$) is about zero. In another aspect, an effective refractive index of a coupled symmetric mode ($n_s$) between the first waveguide core and the second waveguide core is approximately equal to an effective refractive index of a coupled anti-symmetric mode ($n_a$) between the first waveguide core and the second waveguide core. In another aspect, a crosstalk of the first waveguide core and the second waveguide core is suppressed down about −50 dB to −60 dB. In another aspect, the width (w) is from 350 nm to 500 nm; the number (N) of alternating subwavelength ridges is from 3 to 5; the periodicity ($\Lambda$) is from 2 to 130 nm; and the filling fraction ($\rho$) is from 0.4 to 0.6. In another aspect, the width (w) is selected create the total coupling coefficient ($|\kappa|$) when the width (w), the height (h), the number (N) of alternating subwavelength ridges, the periodicity ($\Lambda$) and the filling fraction ($\rho$) are specified. In another aspect, the first waveguide core and second waveguide core comprise silica or silicon. In another aspect, the first waveguide core and second waveguide core comprise a cross-sectional shape that is circular, square, rectangular, a slab, a slot, a strip, or a rib. In another aspect, the subwavelength multilayer cladding comprises an anisotropic metamaterial. In another aspect, the alternating subwavelength ridges are substantially parallel to the first and second waveguide cores. In another aspect, the alternating subwavelength ridges are substantially perpendicular to the first and second waveguide cores as depicted in FIGS. 12(a)-(b). In another aspect, the alternating subwavelength ridges are tilted with respect to the first and second waveguide cores by a tilted angle as depicted in FIGS. 13(a)-(b). In another aspect, the tilted angle is approximately 73 degrees as depicted in FIG. 14(b).

Figure 11:
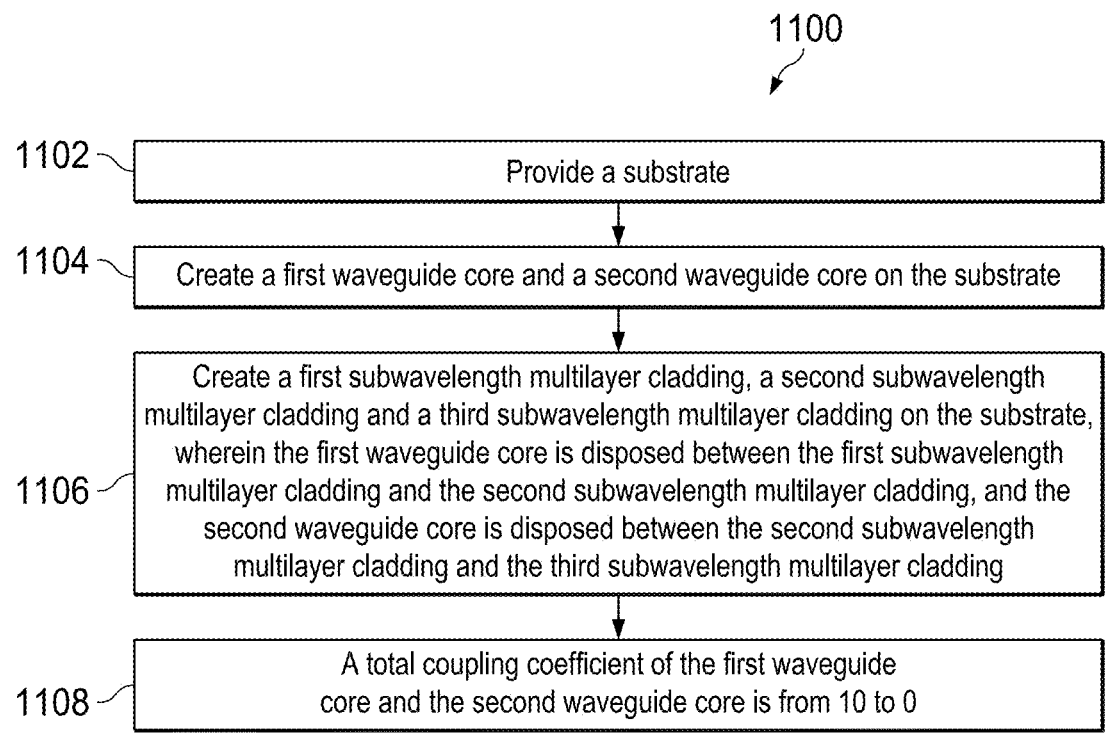
FIG. 11 depicts a method 1100 of fabricating a waveguide in accordance with another embodiment of the present invention.

FIG. 11 depicts a method 1100 of fabricating a waveguide in accordance with another embodiment of the present invention. A substrate is provided in block 1102. A first waveguide core and a second waveguide core are created on the substrate in block 1104. The first waveguide core and the second waveguide core each have a width (w) and a height (h). A first subwavelength multilayer cladding, a second subwavelength multilayer cladding and a third subwavelength multilayer cladding are created on the substrate in block 1106. The first waveguide core is disposed between the first subwavelength multilayer cladding and the second subwavelength multilayer cladding, the second waveguide is disposed between the second subwavelength multilayer cladding and the third subwavelength multilayer cladding. Each subwavelength multilayer cladding comprises a number (N) of alternating subwavelength ridges having a periodicity ($\Lambda$) and a filling fraction ($\rho$). A total coupling coefficient ($|\kappa|$) of the first waveguide core and the second waveguide core is from 10 to 0 as shown in block 1108.

In one aspect, the total coupling coefficient ($|\kappa|$) is about zero. In another aspect, an effective refractive index of a coupled symmetric mode ($n_s$) between the first waveguide core and the second waveguide core is approximately equal to an effective refractive index of a coupled anti-symmetric mode ($n_a$) between the first waveguide core and the second waveguide core. In another aspect, a crosstalk of the first waveguide core and the second waveguide core is suppressed down about −50 dB to −60 dB. In another aspect, the width (w) is from 350 nm to 500 nm; the number (N) of alternating subwavelength ridges is from 3 to 5; the periodicity ($\Lambda$) is from 2 to 130 nm; and the filling fraction ($\rho$) is from 0.4 to 0.6. In another aspect, the method further includes selecting the width (w) to create the total coupling coefficient ($|\kappa|$) when the width (w), the height (h), the number (N) of alternating subwavelength ridges, the periodicity ($\Lambda$) and the filling fraction ($\rho$) are specified. In another aspect, the first waveguide core and second waveguide core comprise silica or silicon. In another aspect, the first waveguide core and second waveguide core comprise a cross-sectional shape that is circular, square, rectangular, a slab, a slot, a strip, or a rib. In another aspect, the subwavelength multilayer cladding comprises an anisotropic metamaterial. In another aspect, the alternating subwavelength ridges are substantially perpendicular to the first and second waveguide cores as depicted in FIGS. 12(a)-(b). In another aspect, the alternating subwavelength ridges are tilted with respect to the first and second waveguide cores by a tilted angle as depicted in FIGS. 13(a)-(b). In another aspect, the tilted angle is approximately 73 degrees as depicted in FIGS. 14(b).

The previous examples describe waveguides having sublength gratings or alternating subwavelength ridges that are substantially parallel to the waveguide. The exceptional coupling that suppresses waveguide crosstalk and results in infinitely long coupling length is mainly for a fundamental transverse electric ($TE_0$) mode. However, a similar exceptional coupling phenomenon also can be achieved with a fundamental transverse magnetic ($TM_0$) mode by rotating the subwavelength gratings so that they are arrayed in the propagation direction as in FIGS. 12(a) and 13(b) (i.e., the subwavelength gratings or alternating subwavelength ridges are facing substantially perpendicular to the waveguide, thus a perpendicular-eskid).

FIGS. 12(a)-12(b) depict (a) top and (b) perspective views, respectively, of a coupled perpendicular extreme skin-depth (perpendicular-eskid) waveguide for exceptional coupling in $TM_0$ modes in accordance with another embodiment of the present invention. FIG. 12(c) depicts electric field profiles ($Re[E_y]$) of the coupled symmetric ($E_y^{sym}$, upper) and anti-symmetric ($E_y^{anti}$, lower) $TM_0$ modes, respectively, corresponding to FIGS. 12(a)-(b). For $TM_0$ mode, $E_y$ is dominant, mainly causing the crosstalk. However, an anisotropic dielectric perturbation can be introduced with the perpendicular-eskid multilayers, allowing other field components $E_x$ and $E_z$ to compensate for the coupling from the $E_y$ field component. The exceptional coupling for $TM_0$ mode occurs when the eskid geometries satisfy this condition.

FIGS. 12(d)-12(e) depict (d) numerically simulated effective refractive indices of the $TM_0$ symmetric $n_s$ (solid blue) and anti-symmetric $n_a$ (solid orange) modes as a function of wavelength λ, and (e) their corresponding normalized coupling length (dotted blue) corresponding to FIGS. 12(a)-(b). The red-shaded and white-background regions indicate non-trivial ($n_s<n_a$) and typical ($n_s>n_a$) coupling regions, respectively. Notice that there is an exceptional coupling (i.e., $n_s=n_a$) at the transition between typical and non-trivial coupling regions. The red arrow in FIG. 12(e) indicates the exceptional coupling, where the coupling length approaches infinity (i.e., $L_c\to\infty$) for coupled $TM_0$ modes. This means complete suppression of waveguide crosstalk in the coupled $TM_0$ modes. The geometric parameters are set to h=220 nm, w=490 nm, $w_{SWG}$=600 nm, Λ=100 nm, ρ=0.5, and g=50 nm.

Similar to $TE_0$ exceptional coupling with a parallel-eskid waveguide, the exceptional coupling point can be engineered by changing the geometric parameters such as waveguide width w, the width of subwavelength gratings $w_{SWG}$, the offset gap g between the core and subwavelength gratings, periodicity Λ, and filling fraction of silicon ρ.

The previously described exceptional coupling with sub-length gratings or alternating subwavelength ridges that are parallel to the waveguide is achieved with anisotropic dielectric perturbation, whose degree was tuned by changing the waveguide core width. For engineering anisotropic dielectric perturbation, the tilted angle of subwavelength gratings also can be tuned for achieving the anisotropic dielectric perturbation.

FIGS. 13(a)-13(b) depict (a) top and (b) perspective views of a coupled tilted extreme skin-depth (tilted-eskid) waveguide for broadband exceptional coupling in $TE_0$ modes in accordance with another embodiment of the present invention. The geometric parameters are indicated in the scheme. FIG. 13(c) depicts electric field profiles (Re[$E_x$]) of the coupled symmetric ($E_x^{sym}$, upper) and anti-symmetric ($E_x^{anti}$, lower) $TE_0$ modes, respectively, when the tilted angle is $\theta_{tilt}$=73°.

FIGS. 13(d)-13(e) depict numerically simulated effective refractive indices as a function of tilted angle $\theta_{tilt}$ for the $TE_0$ symmetric $n_s$ (sloid blue) and anti-symmetric $n_a$ (solid orange) modes, and (e) their corresponding normalized coupling length (dotted blue). The angular dependency of effective mode theory (EMT) was used for representing subwavelength grating (or metamaterial) regions. FIG. 13(e) shows the corresponding normalized coupling lengths $L_c/\lambda_0$ (dotted blue). The red-shaded and white-background regions in FIGS. 13(d) and 13(e) show the non-trivial ($n_s<n_a$) and typical ($n_s>n_a$) coupling regions, respectively. The Inset box in FIG. 13(d) shows zoomed-in views of the modes, clearly indicating a non-trivial coupling region ($n_s<n_a$). The exceptional coupling ($n_s=n_a$) is observed at the transition between typical and non-trivial coupling regions, achieving infinitely long coupling length (i.e., $L_c\to\infty$). The red arrow in FIG. 13(e) indicates the exceptional coupling, where $n_s=n_a$, causing infinitely long coupling length (i.e., $L_c\to\infty$) for the coupled $TE_0$ modes. The geometric parameters are set to h=220 nm, w=500 nm, $w_{SWG}$=550 nm, Λ=100 nm, ρ=0.5, and g=0 nm. The free space wavelength is =1550 nm. Note that the exceptional coupling is achieved by tuning the tilted angle of subwavelength gratings while fixing other geometric parameters.

FIG. 14(a) shows the numerically simulated normalized coupling length $L_c/\lambda_0$ map of the coupled $TE_0$ modes as functions of tilted angle $\theta_{tilt}$ and core width w. The free space wavelength and other parameters are the same as in FIGS. 13(a)-(e). Here the case of $\theta_{tilt}$=90 deg corresponds to the parallel-eskid described above. Notice that, as the core width w increases, the tilted angle $\theta_{bit}$ for achieving exceptional coupling decreases, converging to $\theta_{tilt}\approx$73 deg. The arrow indicates the exceptional coupling in tilted-eskid waveguides. The converged exceptional coupling near the $\theta_{bit}\approx$73 deg shows less sensitivity per the core width w, suggesting a broadband nature of exceptional coupling at this condition.

FIG. 14(b) depicts normalized coupling lengths $L_c/\lambda_0$ of the tilted-eskid waveguides when $\theta_{tilt}$=73 deg and w=550 nm (blue solid line) of broadband exceptional coupling with tilted-eskid waveguides. For comparison, the exceptional coupling with a parallel-eskid ($\theta_{tilt}\approx$90 deg and w=450 nm) is also plotted with orange dots. It is clearly noted that the bandwidth of exceptional coupling is broadened with a tilted-eskid waveguide. This broadband exceptional coupling with a tilted-eskid waveguide also can be achieved with different geometric parameters (e.g., different w, $w_{SWG}$, Λ, and ρ) by tuning the tilted angle $\Lambda_{tilt}$. This significantly increased bandwidth for the exceptional coupling is crucial for applying the eskid waveguide for large-scale high-density photonic chip integration, especially for applications requiring broadband performance in the telecommunication band.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of" As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process(s) steps, or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB.

Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of particular embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke 35 U.S.C. § 112(f) as it exists on the date of filing hereof unless the words "means for" or "step for" are explicitly used in the particular claim.

REFERENCES

1. D. Thomson, A. Zilkie, J. E. Bowers, T. Komljenovic, G. T. Reed, L. Vivien, D. MarrisMorini, E. Cassan, L. Virot, J.-M. F'ed'eli, J.-M. Hartmann, J. H. Schmid, D.-X. Xu, F. Boeuf, P. O'Brien, G. Z. Mashanovich, and M. Nedeljkovic, "Roadmap on silicon photonics," J. Opt. 18(7), 073,003 (2016).
2. E. Agrell, M. Karlsson, A. R. Chraplyvy, D. J. Richardson, P. M. Krummrich, P. Winzer, K. Roberts, J. K. Fischer, S. J. Savory, B. J. Eggleton, M. Secondini, F. R. Kschischang, Lord, J. Prat, I. Tomkos, J. E. Bowers, S. Srinivasan, M. Brandt-Pearce, and N. Gisin, "Roadmap of optical communications," J. Opt 18(6), 063,002 (2016).
3. P. Marin-Palomo, J. N. Kemal, M. Karpov, A. Kordts, J. Pfeifle, M. H. Pfeiffer, P. Trocha, S. Wolf, V. Brasch, M. H. Anderson, R. Rosenberger, K. Vijayan, W. Freude, T. J. Kippenberg, and C. Koos, "Microresonator-based solitons for massively parallel coherent optical communications," Nature 546(7657), 274-279 (2017).
4. A. Fu"l"op, M. Mazur, A. Lorences-Riesgo, O. B. Helgason, P.-H. Wang, Y. Xuan, D. E. Leaird,' M. Qi, P. A. Andrekson, A. M. Weiner, et al., "High-order coherent communications using mode-locked dark-pulse Kerr combs from microresonators," Nat. Commun. 9(1), 1-8 (2018).
5. C. Sun, M. T. Wade, Y. Lee, J. S. Orcutt, L. Alloatti, M. S. Georgas, A. S. Waterman, J. M. Shainline, R. R. Avizienis, S. Lin, B. R. Moss, R. Kumar, F. Pavanello, A. H. Atabaki, H. M. Cook, A. J. Ou, J. C. Leu, Y.-H. Chen, K. Asanovi'c, R. J. Ram, M. A. Popovi'c, and V. M. Stojanovi'c, "Single-chip microprocessor that communicates directly using light," Nature 528(7583), 534-538 (2015).
6. A. H. Atabaki, S. Moazeni, F. Pavanello, H. Gevorgyan, J. Notaros, L. Alloatti, M. T. Wade, C. Sun, S. A. Kruger, H. Meng, K. A. Qubaisi, I. Wang, B. Zhang, A. Khilo, C. V. Baiocco, M. A. Popovi'c, V. M. Stojanovi'c, and R. J. Ram, "Integrating photonics with silicon nanoelectronics for the next generation of systems on a chip," Nature 556(7701),
7. F. Liang, N. Clarke, P. Patel, M. Loncar, and Q. Quan, "Scalable photonic crystal chips for high sensitivity protein detection," Opt. Express 21(26), 32,306-32,312 (2013).
8. X. Fan and I. M. White, "Optofluidic microsystems for chemical and biological analysis," Nat. Photon. 5(10), 591-597 (2011).
9. D.-X. Xu, A. Densmore, A. Del^age, P. Waldron, R. McKinnon, S. Janz, J. Lapointe, G. Lopinski, T. Mischki, E. Post, P. Cheben, and J. H. Schmid, "Folded cavity SOI microring sensors for high sensitivity and real time measurement of biomolecular binding," Opt. Express 16(19), 15, 137-15, 148 (2008).
10. N. Jokerst, M. Royal, S. Palit, L. Luan, S. Dhar, and T. Tyler, "Chip scale integrated microresonator sensing systems," J. Biophotonics 2(4), 212-226 (2009).

11. S. Lin and K. B. Crozier, "Trapping-assisted sensing of particles and proteins using on-chip optical microcavities," ACS Nano 7(2), 1725-1730 (2013).
12. M.-G. Suh, Q.-F. Yang, K. Y. Yang, X. Yi, and K. J. Vahala, "Microresonator soliton dualcomb spectroscopy," Science 354(6312), 600-603 (2016).
13. A. Dutt, C. Joshi, X. Ji, J. Cardenas, Y. Okawachi, K. Luke, A. L. Gaeta, and
M. Lipson, "On-chip dual-comb source for spectroscopy," Sci. Adv. 4(3), e1701, 858 (2018).
14. J. K. Doylend, M. Heck, J. T. Bovington, J. D. Peters, L. Coldren, and J. Bowers, "Twodimensional free-space beam steering with an optical phased array on silicon-on-insulator," Opt. Express 19(22), 21, 595-21, 604 (2011).
15. J. Sun, E. Timurdogan, A. Yaacobi, E. S. Hosseini, and M. R. Watts, "Large-scale nanophotonic phased array," Nature 493(7431), 195 (2013).
16. C. V. Poulton, M. J. Byrd, M. Raval, Z. Su, N. Li, E. Timurdogan, D. Coolbaugh, D. Vermeulen, and M. R. Watts, "Large-scale silicon nitride nanophotonic phased arrays at infrared and visible wavelengths," Opt. Lett. 42(1), 21-24 (2017).
17. S. Kim, D. A. Westly, B. J. Roxworthy, Q. Li, A. Yulaev, K. Srinivasan, and V. A. Aksyuk, "Photonic waveguide to free-space Gaussian beam extreme mode converter," Light Sci. Appl. 7(1), 72 (2018).
18. D. E. Chang, V. Vuleti'c, and M. D. Lukin, "Quantum nonlinear optics—photon by photon," Nat. Photon. 8(9), 685 (2014).
19. Q. Li, M. Davanc, o, and K. Srinivasan, "Efficient and low-noise single-photon-level frequency conversion interfaces using silicon nanophotonics," Nat. Photon. 10(6), 406 (2016).
20. B. Hausmann, I. Bulu, V. Venkataraman, P. Deotare, and M. Lonˇcar, "Diamond nonlinear photonics," Nat. Photon. 8(5), 369 (2014).
21. M. Hummon, S. Kang, D. Bopp, Q. Li, D. Westly, S. Kim, C. Fredrick, S. Diddams, K. Srinivasan, V. Aksyuk, and J. Kitching, "Photonic chip for laser stabilization to an atomic vapor at a precision of $10^{-11}$," Optica 5(4), 2334 (2018).
22. J. Kitching, E. A. Donley, S. Knappe, M. Hummon, A. Dellis, J. Sherman, K. Srinivasan, V. A. Aksyuk, Q. Li, D. Westly, B. Roxworthy, and A. Lal, "NIST on a Chip: Realizing SI units with microfabricated alkali vapour cells," J. Phys. Conf. Ser. 723(1), 012, 056 (2016).
23. K. K. Mehta, C. D. Bruzewicz, R. McConnell, R. J. Ram, J. M. Sage, and J. Chiaverini, "Integrated optical addressing of an ion qubit," Nat. Nanotech. 11, 1066-1070 (2016).
24. M. Kohnen, M. Succo, P. Petrov, R. Nyman, M. Trupke, and E. Hinds, "An array of integrated atom-photon junctions," Nat. Photon. 5(1), 35-38 (2011).
25. T. J. Kippenberg, R. Holzwarth, and S. Diddams, "Microresonator-based optical frequency combs," Science 332(6029), 555-559 (2011).
26. D. Spencer, T. Drake, T. Briles, J. Stone, L. Sinclair, C. Fredrick, Q. Li, D. Westly, B. Ilic, Bluestone, N. Volet, T. Komljenovic, L. Chang, S. H. Lee, D. Y. Oh, M.-G. Suh, K. Y. Yang, M. H. P. Pfeiffer, T. J. Kippenberg, E. Norberg, L. Theogarajan, K. Vahala, N. R. Newbury, K. Srinivasan, J. E. Bowers, S. A. Diddams, and S. B. Papp, "An optical-frequency synthesizer using integrated photonics." Nature 557(7703), 81-85 (2018).
27. Q. Li, T. C. Briles, D. A. Westly, T. E. Drake, J. R. Stone, B. R. Ilic, S. A. Diddams, S. B. Papp, and K. Srinivasan, "Stably accessing octave-spanning microresonator frequency combs in the soliton regime," Optica 4(2), 193-203 (2017).
28. S. Kim, K. Han, C. Wang, J. A. Jaramillo-Villegas, X. Xue, C. Bao, Y. Xuan, D. E. Leaird, A. M. Weiner, and M. Qi, "Dispersion engineering and frequency comb generation in thin silicon nitride concentric microresonators," Nat. Commun. 8(1), 372 (2017).
29. R. F. Oulton, V. J. Sorger, D. Genov, D. Pile, and X. Zhang, "A hybrid plasmonic waveguide for subwavelength confinement and long-range propagation," Nat. Photon. 2(8), 496 (2008).
30. V. J. Sorger, R. F. Oulton, R.-M. Ma, and X. Zhang, "Toward integrated plasmonic circuits," MRS bulletin 37(08), 728-738 (2012).
31. S. Kim and M. Qi, "Mode-evolution-based polarization rotation and coupling between silicon and hybrid plasmonic waveguides," Sci. Rep. 5, 18, 378 (2015).
32. C. Haffner, W. Heni, Y. Fedoryshyn, J. Niegemann, A. Melikyan, D. L. Elder, B. Baeuerle, Y. Salamin, A. Josten, U. Koch, C. Hoessbacher, F. Ducry, J. Juchli, A. Emboras, D. Hillerkuss, M. Kohl, L. R. Dalton, C. Hafner, and J. Leuthold, "All-plasmonic Mach— Zehnder modulator enabling optical high-speed communication at the microscale," Nat. Photon. 9(8), 525-528 (2015).
33. S. Kim and M. Qi, "Polarization rotation and coupling between silicon waveguide and hybrid plasmonic waveguide," Opt. Express 23(8), 9968-9978 (2015).
34. S. Kim and M. Qi, "Copper nanorod array assisted silicon waveguide polarization beam splitter," Opt. Express 22(8), 9508-9516 (2014).
35. M. Ayata, Y. Fedoryshyn, W. Heni, B. Baeuerle, A. Josten, M. Zahner, U. Koch, Y. Salamin, C. Hoessbacher, C. Haffner, D. L. Elder, L. R. Dalton, and J. Leuthold, "High-speed plasmonic modulator in a single metal layer," Science 358(6363), 630-632 (2017).
36. W. Song, R. Gatdula, S. Abbaslou, M. Lu, A. Stein, W. Y. Lai, J. Provine, R. F. W. Pease, D. N. Christodoulides, and W. Jiang, "High-density waveguide superlattices with low crosstalk," Nat. Commun. 6, 7027 (2015).
37. R. Gatdula, S. Abbaslou, M. Lu, A. Stein, and W. Jiang, "Guiding light in bent waveguide superlattices with low crosstalk," Optica 6(5), 585-591 (2019).
38. B. Shen, R. Polson, and R. Menon, "Metamaterial-waveguide bends with effective bend radius/10/2," Opt. Lett. 40(24), 5750-5753 (2015).
39. B. Shen, R. Polson, and R. Menon, "Increasing the density of passive photonic-integrated circuits via nanophotonic cloaking," Nat. Commun. 7, 13, 126 (2016).
40. L. H. Gabrielli, D. Liu, S. G. Johnson, and M. Lipson, "On-chip transformation optics for multimode waveguide bends," Nat. Commun. 3, 1217 (2012).
41. S. Jahani, S. Kim, J. Atkinson, J. C. Wirth, F. Kalhor, A. A. Noman, W. D. Newman, P. Shekhar, K. Han, V. Van, R. G. DeCorby, L. Chrostowski, M. Qi, and Z. Jacob, "Controlling evanescent waves using silicon photonic all-dielectric metamaterials for dense integration," Nat. Commun. 9(1), 1893 (2018).
42. P. Cheben, R. Halir, J. H. Schmid, H. A. Atwater, and D. R. Smith, "Subwavelength integrated photonics," Nature 560(7720), 565-572 (2018).
43. Z. Li, M.-H. Kim, C. Wang, Z. Han, S. Shrestha, A. C. Overvig, M. Lu, A. Stein, A. M. Agarwal, M. Lonˇ car, and N. Yu, "Controlling propagation and coupling of waveguide modes using phase-gradient metasurfaces," Nat. Nanotechnol. 12(7), 675 (2017).

44. C. Wang, Z. Li, M.-H. Kim, X. Xiong, X.-F. Ren, G.-C. Guo, N. Yu, and M. Lonˇ car, "Metasurface-assisted phase-matching-free second harmonic generation in lithium niobate waveguides," Nat. Commun. 8(1), 1-7 (2017).
45. Z. Wang, T. Li, A. Soman, D. Mao, T. Kananen, and T. Gu, "On-chip wavefront shaping with dielectric metasurface," Nat. Commun. 10(1), 1-7 (2019).
46. R. Halir, P. J. Bock, P. Cheben, A. Ortega-Mon˜ux, C. Alonso-Ramos, J. H. Schmid, J. Lapointe, D.-X. Xu, J. G. Wangu"emert-P'erez, 'I. Molina-Fern'andez, and S. Janz, "Waveguide sub-wavelength structures: a review of principles and applications," Laser Photonics Rev. 9(1), 25-49 (2015).
47. D. Benedikovic, P. Cheben, J. H. Schmid, D.-X. Xu, B. Lamontagne, S. Wang, J. Lapointe, R. Halir, A. Ortega-Mon˜ux, S. Janz, and M. Dado, "Subwavelength index engineered surface grating coupler with sub-decibel efficiency for 220-nm silicon-on-insulator waveguides," Opt. Express 23(17), 22, 628-22, 635 (2015).
48. J. S. Orcutt, A. Khilo, C. W. Holzwarth, M. A. Popovi'c, H. Li, J. Sun, T. Bonifield, R. Hollingsworth, F. X. Kartner, H. I. Smith, V. Stojanovi'c, and R. J. Ram, "Nanophotonic integration in state-of-the-art CMOS foundries," Opt. Express 19(3), 2335-2346 (2011).
49. V. Stojanovi'c, R. J. Ram, M. Popovi'c, S. Lin, S. Moazeni, M. Wade, C. Sun, L. Alloatti, A. Atabaki, F. Pavanello, N. Mehta, and P. Bhargava, "Monolithic silicon-photonic platforms in state-of-the-art CMOS SOI processes," Opt. Express 26(10), 13, 106-13, 121 (2018).
50. G. W. Milton, The theory of composites (Cambridge University Press, 2002).
51. S. Jahani and Z. Jacob, "Transparent subdiffraction optics: nanoscale light confinement without metal," Optica 1(2), 96-100 (2014).
52. A. Yariv and P. Yeh, Photonics: optical electronics in modern communications (Oxford University Press, 2006).
53. W.-P. Huang, "Coupled-mode theory for optical waveguides: an overview," J. Opt. Soc. Am. 11(3), 963-983 (1994).
54. K. Han, S. Kim, J. Wirth, M. Teng, Y. Xuan, B. Niu, and M. Qi, "Strip-slot direct mode coupler," Opt. Express 24(6), 6532-6541 (2016).

What is claimed is:

1. An optical waveguide comprising:
a first waveguide core having a width (w) and a height (h), wherein the first waveguide core is disposed between a first subwavelength multilayer cladding and a second subwavelength multilayer cladding;
a second waveguide core having the width (w) and the height (h), wherein the second waveguide core is disposed between the second subwavelength multilayer cladding and a third subwavelength multilayer cladding;
each subwavelength multilayer cladding comprising a number (N) of alternating subwavelength ridges having a periodicy ($\Lambda$) and a filling fraction ($\rho$); and
wherein a total coupling coefficient ($|\kappa|$) of the first waveguide core and the second waveguide core is from 10 to 0.

2. The waveguide of claim 1, wherein the total coupling coefficient ($|\kappa|$) is about zero.

3. The waveguide of claim 1, wherein an effective refractive index of a coupled symmetric mode ($n_s$) between the first waveguide core and the second waveguide core is approximately equal to an effective refractive index of a coupled anti-symmetric mode ($n_a$) between the first waveguide core and the second waveguide core.

4. The waveguide of claim 1, wherein a crosstalk of the first waveguide core and the second waveguide core is suppressed down about −50 dB to −60 dB.

5. The waveguide of claim 1, wherein:
the width (w) is from 350 nm to 500 nm;
the number (N) of alternating subwavelength ridges is from 3 to 5;
the periodicy ($\Lambda$) is from 2 to 130 nm; and
the filling fraction ($\rho$) is from 0.4 to 0.6.

6. The waveguide of claim 1, wherein the width (w) is selected create the total coupling coefficient ($|\kappa|$) when the width (w), the height (h), the number (N) of alternating subwavelength ridges, the periodicy ($\Lambda$) and the filling fraction ($\rho$) are specified.

7. The waveguide of claim 1, wherein the first waveguide core and second waveguide core comprise silica or silicon.

8. The waveguide of claim 1, wherein the first waveguide core and second waveguide core comprise a cross-sectional shape that is circular, square, rectangular, a slab, a slot, a strip, or a rib.

9. The waveguide of claim 1, wherein the subwavelength multilayer cladding comprises an anisotropic metamaterial.

10. The waveguide of claim 1, wherein the alternating subwavelength ridges are substantially parallel to the first and second waveguide cores.

11. The waveguide of claim 1, wherein the alternating subwavelength ridges are substantially perpendicular to the first and second waveguide cores.

12. The waveguide of claim 1, wherein the alternating subwavelength ridges are tilted with respect to the first and second waveguide cores by a tilted angle.

13. The waveguide of claim 12, wherein the tilted angle is approximately 73 degrees.

14. A method of fabricating a waveguide comprising:
providing a substrate;
creating a first waveguide core and a second waveguide core on the substrate, wherein the first waveguide core and the second waveguide core each have a width (w) and a height (h);
creating a first subwavelength multilayer cladding, a second subwavelength multilayer cladding and a third subwavelength multilayer cladding on the substrate, wherein the first waveguide core is disposed between the first subwavelength multilayer cladding and the second subwavelength multilayer cladding, the second waveguide is disposed between the second subwavelength multilayer cladding and the third subwavelength multilayer cladding, and each subwavelength multilayer cladding comprises a number (N) of alternating subwavelength ridges having a periodicy ($\Lambda$) and a filling fraction ($\rho$); and
wherein a total coupling coefficient ($|\kappa|$) of the first waveguide core and the second waveguide core is from 10 to 0.

15. The method of claim 14, wherein the total coupling coefficient ($|\kappa|$) is about zero.

16. The method of claim 14, wherein an effective refractive index of a coupled symmetric mode ($n_s$) between the first waveguide core and the second waveguide core is approximately equal to an effective refractive index of a coupled anti-symmetric mode ($n_a$) between the first waveguide core and the second waveguide core.

17. The method of claim 14, wherein a crosstalk of the first waveguide core and the second waveguide core is suppressed down about −50 dB to −60 dB.

18. The method of claim 14, wherein:
the width (w) is from 350 nm to 500 nm;
the number (N) of alternating subwavelength ridges is from 3 to 5;
the periodicy ($\Lambda$) is from 2 to 130 nm; and
the filling fraction ($\rho$) is from 0.4 to 0.6.

19. The method of claim 14, further comprising selecting the width (w) to create the total coupling coefficient ($|\kappa|$) when the width (w), the height (h), the number (N) of alternating subwavelength ridges, the periodicy ($\Lambda$) and the filling fraction ($\rho$) are specified.

20. The method of claim 14, wherein the first waveguide core and second waveguide core comprise silica or silicon.

21. The method of claim 14, wherein the first waveguide core and second waveguide core comprise a cross-sectional shape that is circular, square, rectangular, a slab, a slot, a strip, or a rib.

22. The method of claim 14, wherein the subwavelength multilayer cladding comprises an anisotropic metamaterial.

23. The method of claim 14, wherein the alternating subwavelength ridges are substantially parallel to the first and second waveguide cores.

24. The method of claim 14, wherein the alternating subwavelength ridges are substantially perpendicular to the first and second waveguide cores.

25. The method of claim 14, wherein the alternating subwavelength ridges are tilted with respect to the first and second waveguide cores by a tilted angle.

26. The method of claim 25, wherein the tilted angle is approximately 73 degrees.

* * * * *